United States Patent
Johnson et al.

(10) Patent No.: US 6,553,336 B1
(45) Date of Patent: Apr. 22, 2003

(54) SMART REMOTE MONITORING SYSTEM AND METHOD

(75) Inventors: Robert N. Johnson, Silver Spring, MD (US); Ronald D. Smith, Columbia, MD (US); Charlotte K. Smith, Columbia, MD (US); Edward C. Kight, Baltimore, MD (US); George H. Harrop, Washington, DC (US)

(73) Assignee: Telemonitor, Inc., Columbia, MD (US)

( * ) Notice: Subject to any disclaimer, the term of this patent is extended or adjusted under 35 U.S.C. 154(b) by 93 days.

(21) Appl. No.: 09/603,580

(22) Filed: Jun. 26, 2000

Related U.S. Application Data

(60) Provisional application No. 60/140,793, filed on Jun. 25, 1999.

(51) Int. Cl.[7] .................................................. G08B 1/08
(52) U.S. Cl. ........................... 702/188; 702/62; 702/99; 702/108; 702/122; 702/182; 702/185
(58) Field of Search ................................ 702/60–64, 99, 702/108, 113, 114, 117, 118, 121, 122, 182–185, 130–132, 30–32, FOR 103, FOR 104, FOR 106, FOR 111–112, FOR 119, FOR 116, FOR 123–124, FOR 130, FOR 134–135, FOR 142, FOR 170–171; 340/870.01, 870.02, 870.03, 500, 514, 516, 825.69, 825.72, 572.1; 700/286, 291, 295, 277, 278

(56) References Cited

U.S. PATENT DOCUMENTS

| | | | |
|---|---|---|---|
| 4,237,454 A | 12/1980 | Meyer | |
| 4,345,311 A | 8/1982 | Fielden | |
| 4,622,538 A | 11/1986 | Whynacht et al. | |
| 4,700,306 A | 10/1987 | Wallmander | |
| 4,766,432 A | 8/1988 | Field | |
| 4,773,027 A | 9/1988 | Neumann | |
| 4,823,280 A | 4/1989 | Mailandt et al. | |
| 4,831,558 A | 5/1989 | Shoup et al. | |
| 4,845,486 A | 7/1989 | Knight et al. | |
| 4,866,594 A | * 9/1989 | David et al. ................. | 364/138 |
| 4,884,208 A | 11/1989 | Marinelli et al. | |
| 4,916,432 A | * 4/1990 | Tice et al. ................... | 340/518 |
| 4,964,065 A | 10/1990 | Hicks et al. | |
| 4,989,146 A | 1/1991 | Imajo | |
| 5,016,197 A | 5/1991 | Neumann et al. | |
| 5,023,806 A | 6/1991 | Patel | |
| 5,027,297 A | * 6/1991 | Garitty et al. ......... | 340/825.08 |
| 5,027,314 A | 6/1991 | Linwood et al. | |
| 5,061,916 A | 10/1991 | French et al. | |
| 5,155,689 A | 10/1992 | Wortham | |
| 5,173,866 A | 12/1992 | Neumann et al. | |
| 5,225,997 A | 7/1993 | Lederer et al. | |
| 5,260,553 A | 11/1993 | Rockstein et al. | |
| 5,261,276 A | 11/1993 | Gifford | |
| 5,265,032 A | 11/1993 | Patel | |

(List continued on next page.)

FOREIGN PATENT DOCUMENTS

WO      WO 00/18070      3/2000

*Primary Examiner*—Marc S. Hoff
*Assistant Examiner*—Carol S Tsai

(57) ABSTRACT

A remote monitoring system includes transducers, a transducer control module, a communications device, a monitoring system and end-user display terminals. The transducers are disposed on the property and/or equipment in a manner to measure specific characteristics or parameters and communicate with the transducer control module via a wireless communication protocol. The transducer control module receives and analyzes transducer measurements and detects alarm conditions. The transducer control module communicates with the monitoring system via a wide area network and the communications device. The monitoring system receives, stores and analyzes information received from the transducer control module and reports the information to the end-user terminals via a wide area network, such as the Internet, in response to user requests.

99 Claims, 9 Drawing Sheets

U.S. PATENT DOCUMENTS

| | | | |
|---|---|---|---|
| 5,299,132 A | | 3/1994 | Wortham |
| 5,300,980 A | | 4/1994 | Maekawa et al. |
| 5,301,122 A | | 4/1994 | Halpern |
| 5,319,698 A | | 6/1994 | Glidewell et al. |
| 5,340,971 A | | 8/1994 | Rockstein et al. |
| 5,340,973 A | | 8/1994 | Knowles et al. |
| 5,384,622 A | | 1/1995 | Hirata et al. |
| 5,398,190 A | | 3/1995 | Wortham |
| 5,404,199 A | | 4/1995 | Hirata et al. |
| 5,418,537 A | | 5/1995 | Bird |
| 5,424,525 A | | 6/1995 | Rockstein et al. |
| 5,428,546 A | | 6/1995 | Shah et al. |
| 5,430,656 A | * | 7/1995 | Dekel et al. ................ 364/449 |
| 5,442,553 A | | 8/1995 | Parrillo |
| 5,469,372 A | | 11/1995 | McBrearty et al. |
| 5,484,992 A | | 1/1996 | Wilz et al. |
| 5,485,142 A | * | 1/1996 | Stute et al. ................ 340/506 |
| 5,502,543 A | | 3/1996 | Aboujaoude |
| 5,513,111 A | | 4/1996 | Wortham |
| 5,513,244 A | | 4/1996 | Joao et al. |
| 5,519,621 A | | 5/1996 | Wortham |
| 5,525,789 A | | 6/1996 | Rockstein et al. |
| 5,528,219 A | | 6/1996 | Frohlich et al. |
| 5,568,121 A | * | 10/1996 | Lamensdorf ................ 340/539 |
| 5,568,535 A | | 10/1996 | Sheffer et al. |
| 5,572,195 A | | 11/1996 | Heller et al. |
| 5,591,953 A | | 1/1997 | Rockstein et al. |
| 5,594,740 A | * | 1/1997 | LaDue ........................ 379/59 |
| 5,602,757 A | | 2/1997 | Haseley et al. |
| 5,607,357 A | * | 3/1997 | Kim et al. .................... 463/40 |
| 5,610,821 A | | 3/1997 | Gazis et al. |
| 5,616,908 A | | 4/1997 | Wilz et al. |
| 5,636,122 A | | 6/1997 | Shah et al. |
| 5,652,707 A | | 7/1997 | Wortham |
| 5,677,837 A | | 10/1997 | Reynolds |
| 5,678,196 A | | 10/1997 | Doyle |
| 5,689,431 A | | 11/1997 | Rudow et al. |
| 5,717,379 A | * | 2/1998 | Peters ........................ 340/539 |
| RE35,793 E | | 5/1998 | Halpern |
| 5,748,104 A | | 5/1998 | Argyroudis et al. |
| 5,777,580 A | | 7/1998 | Janky et al. |
| 5,777,895 A | | 7/1998 | Kuroda et al. |
| 5,790,977 A | | 8/1998 | Ezekiel |
| 5,791,294 A | | 8/1998 | Manning |
| 5,796,606 A | | 8/1998 | Spring |
| 5,804,810 A | | 9/1998 | Woolley et al. |
| 5,805,442 A | | 9/1998 | Crater et al. |
| 5,808,285 A | | 9/1998 | Rockstein et al. |
| 5,808,907 A | | 9/1998 | Shetty et al. |
| 5,825,283 A | | 10/1998 | Camhi |
| 5,832,394 A | | 11/1998 | Wortham |
| 5,854,994 A | | 12/1998 | Canada et al. |
| 5,869,819 A | | 2/1999 | Knowles et al. |
| 5,884,221 A | | 3/1999 | Wortham |
| 5,884,982 A | | 3/1999 | Yemini |
| 5,892,441 A | | 4/1999 | Woolley et al. |
| 5,914,671 A | | 6/1999 | Tuttle |
| 5,917,405 A | | 6/1999 | Joao |
| 5,918,191 A | | 6/1999 | Patel |
| 5,922,040 A | | 7/1999 | Prabhakaran |
| 5,923,270 A | | 7/1999 | Sampo et al. |
| 5,928,306 A | | 7/1999 | France et al. |
| 5,945,919 A | | 8/1999 | Trask |
| 6,069,570 A | * | 5/2000 | Herring ................ 340/825.49 |
| 6,100,792 A | * | 8/2000 | Ogino et al. ................ 340/426 |
| 6,157,319 A | * | 12/2000 | Jones et al. ............ 340/825.72 |
| 6,173,727 B1 | * | 1/2001 | Davey ........................... 137/1 |
| 6,215,404 B1 | | 4/2001 | Morales ...................... 340/577 |
| 6,225,938 B1 | * | 5/2001 | Hayes et al. ................ 341/176 |
| 6,239,700 B1 | * | 5/2001 | Hoffman et al. ............. 340/539 |
| 6,285,953 B1 | * | 9/2001 | Harrison et al. ............. 701/213 |
| 6,330,499 B1 | * | 12/2001 | Chou et al. ................... 701/33 |

* cited by examiner

SMART REMOTE MONITORING SYSTEM AND METHOD

CROSS-REFERENCE TO RELATED APPLICATIONS

This application claims priority from U.S. Provisional Patent Application Serial No. 60/140,793, entitled "Smart Remote Monitoring System and Method" and filed Jun. 25, 1999. The disclosure of that provisional application is incorporated herein by reference in its entirety.

BACKGROUND OF THE INVENTION

1. Technical Field

The present invention relates to a system and method used for the remote monitoring and control of property and equipment. The primary application is for absentee owners of yachts and vacation homes, however, the present invention also can be used for commercial and industrial monitoring and control.

2. Discussion of Related Art

Property and equipment are generally valuable assets of an owner. The value of these items to the owner or authorized user may be derived from the monetary worth and/or the utility provided to the owner or authorized user, such as in the cases of a home, boat or automobile. As such, it is imperative that the condition of these items be maintained to provide the upmost worth and utility. In order to maintain the items in a proper condition, the items should be monitored by the owner or authorized user to ensure the presence of acceptable item conditions and to identify situations that may lead to item damage. Monitoring of an item is a tedious task and typically requires the owner or authorized user to be in the vicinity of the item. However, various property, such as vacation homes and vehicles, are usually remote from the owner or authorized user, thereby enabling monitoring at infrequent intervals. Thus, improper item conditions may arise without notice to an owner or authorized user, thereby tending to cause damage to the item. The related art attempts to overcome the above problem by providing various remote monitoring systems. For example, U.S. Pat. No. 4,831,558 (Shoup et al) discloses a system for monitoring physical phenomena and changes in structures. The system includes a plurality of programmable intelligent transducers arranged in an array with each being uniquely addressable by a remote controller to perform its functions (i.e., measure, translate analog measurement into digital signals and transmit the digital signals to the controller). The monitoring is selective to each individual intelligent transducer. The intelligent transducers combine measurement, microprocessor and communication functions that are programmed and actuated from the controller.

U.S. Pat. No. 5,790,977 (Ezekiel) discloses a system providing remote access from a remote host system to an instrument. Control and data acquisition software is stored in the instrument and forwarded to the host system. The software is executed on the host system and provides commands to control data acquisition of the instrument. In response to a request from the executed software, acquired data is forwarded from the instrument to the host.

U.S. Pat. No. 5,854,994 (Canada et al) discloses an apparatus including one or more machine monitors which attach to one or more machines to sense a physical machine characteristic, such as vibration or temperature, and produce wireless transmissions corresponding to the sensed characteristic, and a command station for receiving transmissions from the machine monitors and processing the information to provide an indication of a machine condition. A repeater receives the sensor data transmissions from the machine monitors and retransmits the data to the command station A when, due to site conditions, the machine monitors are beyond the receiving range of, or out of the line of sight to, the command station.

U.S. Pat. No. 5,917,405 (Joao) discloses a control apparatus for a vehicle including a first, second and third control devices. The first control device generates and transmits a first signal for one of activating, deactivating, enabling and disabling one of a vehicle component, device system and subsystem. The first control device is located at the vehicle and is responsive to a second signal generated by and transmitted from the second control device. The second control device is located remote from the vehicle and is responsive to a third signal generated by and transmitted from the third control device. The third control device is remote from the vehicle and second control device.

The related art suffers from several disadvantages. In particular, the above-described systems generally require special programming of system monitor devices or sensors prior to system operation. This increases complexity of installation and further complicates incorporation of additional sensors into the system. Further, this specific programming is typically accomplished by personnel familiar with the system, thereby requiring special personnel to install the system and subsequent sensor additions. Moreover, the above-described systems generally detect alarm conditions based on measurements of specific individual sensors. This limits the conditions that may trigger an alarm and may possibly lead to reporting of false alarms or missing an actual alarm condition when such conditions are indicated by a combination of sensor measurements. In addition, the above-described systems are typically not available in a kit form for installation by a consumer.

OBJECTS AND SUMMARY OF THE INVENTION

Accordingly, an object of the present invention is to remotely monitor and control various property and/or equipment.

It is another object of the present invention to enable users to remotely monitor and control property or equipment via a network, such as the Internet.

Yet another object of the present invention is to remotely monitor property and/or equipment and detect user specified alarm conditions based on measurements of a combination of sensors.

Still another object of the present invention is to provide remote monitoring kits including sensor modules and a controller for installation by a user to monitor user property and/or equipment.

A further object of the present invention is to utilize a wireless on/off keyed protocol for communication between sensors and a sensor control module to facilitate remote monitoring of property and/or equipment.

The aforesaid objects are achieved individually and/or in combination, and it is not intended that the present invention be construed as requiring two or more of the objects to be combined unless expressly required by the claims attached hereto.

According to the present invention, a remote monitoring system includes transducers, a transducer control module, a communications device, a monitoring system and end-user display terminals. The transducers are disposed on the property and/or equipment in a manner to measure specific characteristics or parameters and communicate with the transducer control module via a wireless communication protocol. The transducer control module receives and analyzes transducer measurements and detects alarm conditions. The transducer control module communicates with the monitoring system via a wide area network and the communications device. The monitoring system receives, stores and analyzes information received from the transducer control module and reports the information to the end-user terminals via a wide area network, such as the Internet, in response to user requests.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
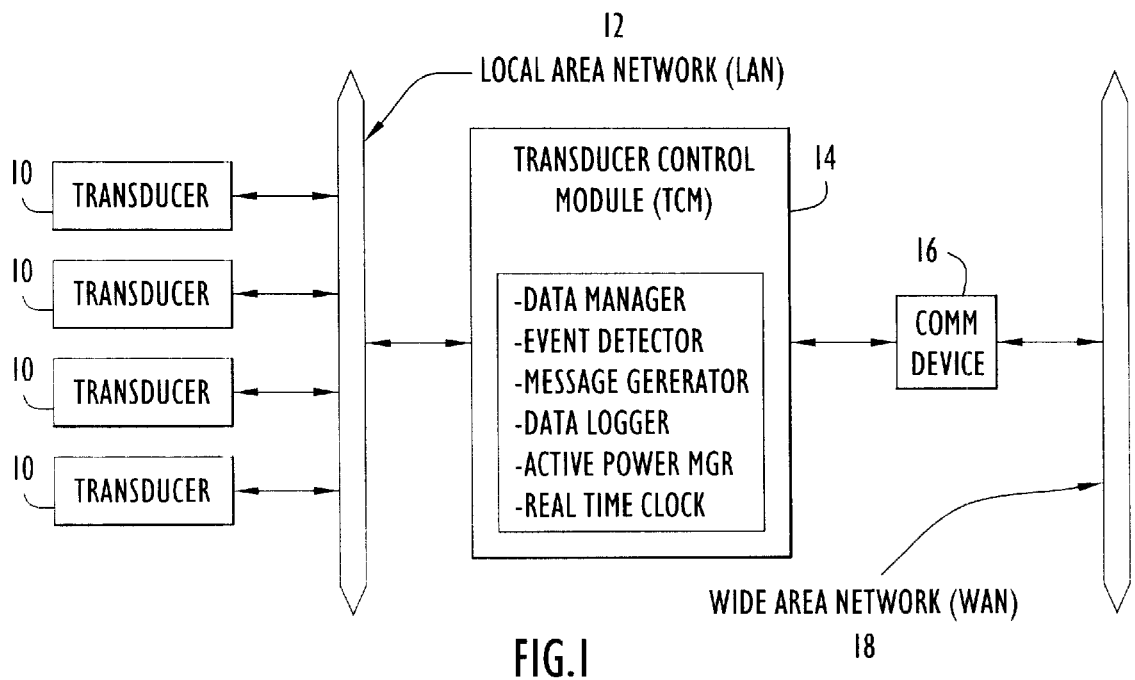
FIG. 1 is a schematic block diagram of an initial portion of the remote monitoring system of the present invention disposed in the proximity of the monitored property or equipment.
Figure 2:
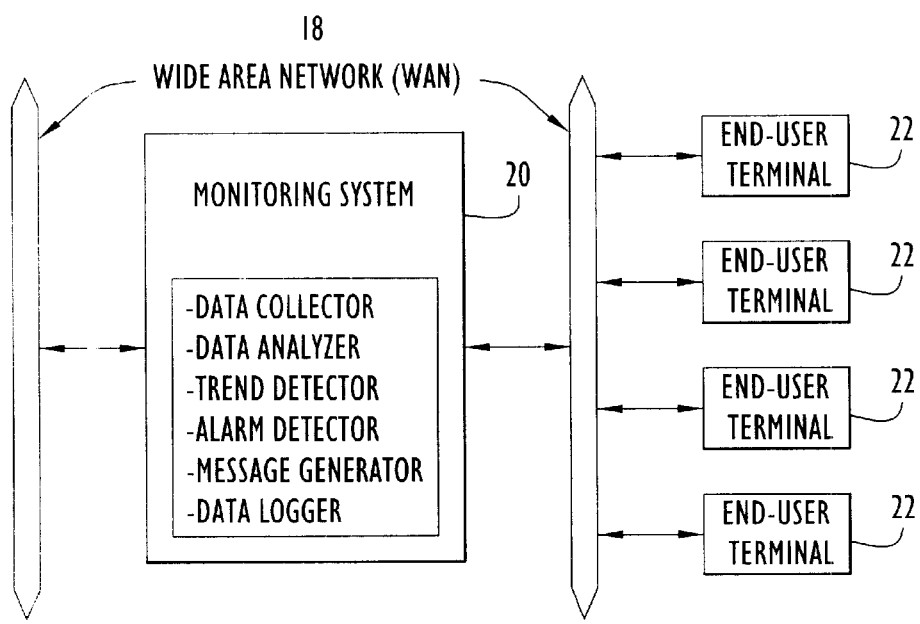
FIG. 2 is a schematic block diagram of the remaining portion of the remote monitoring system of the present invention for analyzing measured information and processing end-user requests.

A smart remote monitoring system according to the present invention is illustrated in FIGS. 1–2. Specifically, the system includes one or more smart, self-identifying, "plug-and-play" transducers or sensor modules 10, a wired or wireless local area network (LAN) 12 for connecting to the transducers, a transducer control module 14 which connects to the transducers via LAN 12, a communications device 16 which connects the transducer control module through a wide area network (WAN) 18 to a monitoring system or station 20 and end-user display terminals 22 which connect to the monitoring system through the same or a different wide area network. The system can be used to provide real-time on-demand status information to end-users, as well as alarm notifications to the end-user and other appropriate entities if certain pre-defined conditions and/or events are detected. These alarm notifications can take the form of telephone, telegraph, facsimile, pager, electronic mail, or other type of communications. End-user terminals 22 are used for obtaining real-time on-demand status information, for entering real-time control instructions, and for programming the monitoring system characteristics, such as setting the alarm notification conditions, communications media, message destinations (e.g., telephone number or e-mail addresses), and message content.

Figure 3:
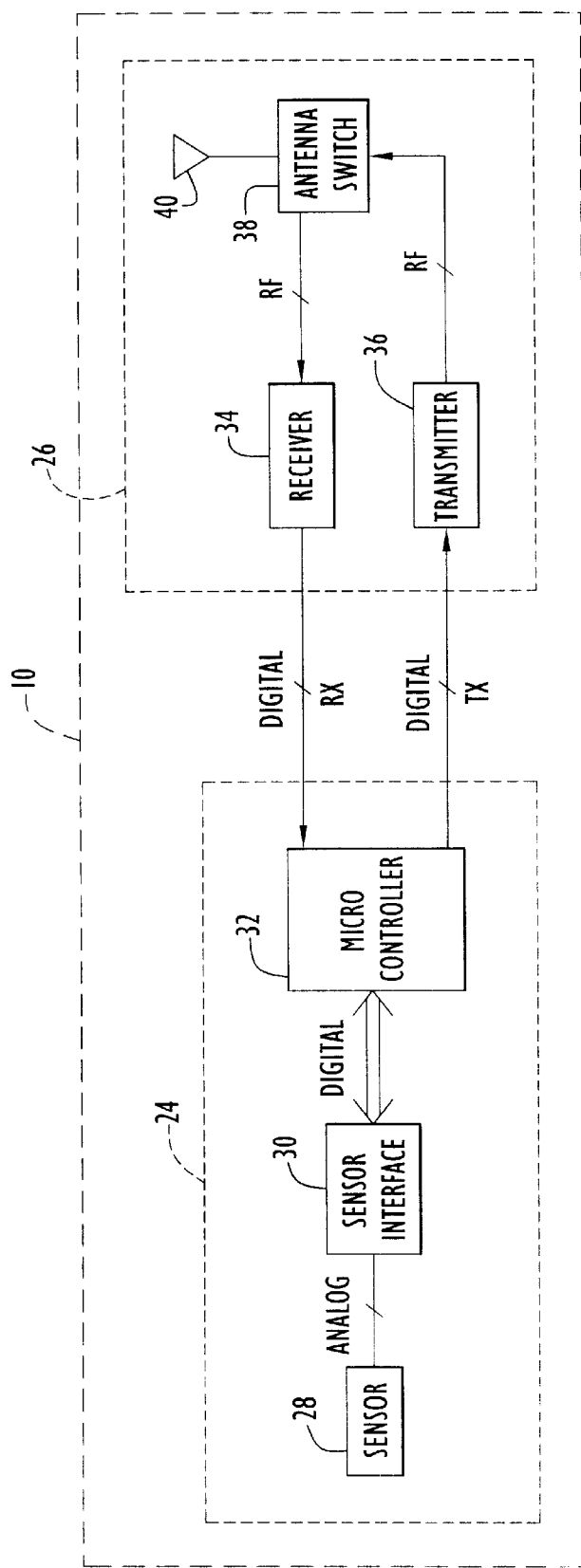
FIG. 3 is a schematic block diagram of a smart transducer of the system of FIG. 1 employing a wireless communication device.

Transducers 10 can be sensors and/or actuators. Transducer actuators may be utilized to control the state of an object, for example, controlling power to a device remotely via terminal 22. In a preferred embodiment, plural transducers are used and connected by wireless local are network (LAN) 12. The transducers are preferably "smart" transducers using technology such as that represented by the IEEE 1451.2 standard, the contents of which are incorporated herein by reference. Generally, a smart transducer is a transducer having intelligence and processing raw sensor data to provide a useful end result. Referring to FIG. 3, each smart transducer 10 preferably includes a sensing device 24 and a wireless communications device 26. Device 24 includes an actual sensing or actuation element 28, a microcontroller 32 providing signal conditioning, a digital communications interface (software and protocol) compatible with the wireless LAN and a Transducer Electronic Data Sheet (TEDS), and a sensor interface 30 disposed between the sensing element and microcontroller for converting analog signals from the sensing element to digital signals compatible with the microcontroller. The sensing element is typically a conventional transducer for measuring a particular parameter and provides analog signals indicating the measured parameter to the interface for conversion to digital signals compatible with the microcontroller. The microcontroller is preferably a PIC processor manufactured by Microchip, but may be any conventional processor. Transducers 10 are wireless for quick and easy installation by a user. Each transducer 10 is typically powered by a battery, preferably a standard nine volt battery, and has an expected operating life of approximately one-year. The transducers communicate with a corresponding transducer control module that receives transducer measurement information and performs various functions in accordance with the realized information as discussed below.

Simple analog transducers (both sensors and actuators) can be used as is or converted to smart transducers for use with the smart remote monitoring system. Transducers 10 typically include technology such as that described in U.S. Pat. No. 6,032,109 and U.S. patent application Ser. No. 09/167,465, filed on Oct. 7, 1998, the disclosures of which are incorporated herein by reference in their entireties.

Each transducer is designed to be "self-identifying" and preferably has a unique identifier (UID) for use in registering that transducer with the monitoring system. The UID is generally factory programmed and is used to distinguish each smart transducer. By way of example only, a maximum of sixteen transducers 10 may be in communication with a transducer control module. Since the transducers are "self-identifying", a transducer may be added to the system at any time via a registration process discussed below. Further, the system may include any quantity of any type of sensor (e.g., two bilge pump sensors and three high water sensors for use in a boating application).

The transducer "self-identification" is preferably accomplished using a modified version of the IEEE 1451.2 Transducer Electronic Datasheet, although some items can be omitted or added as needed for specific monitoring applications. Each transducer 10 includes an electronic datasheet that describes transducer characteristics. The datasheet preferably includes transducer information in the form of a serial number or UID, quantity of control outputs and a description of transducer function. An exemplary TEDS is illustrated in Table I below. Additional information relating to calibration of channel data is stored in the monitoring system database as described below.

TABLE I

Transducer TEDS

| Field Name | Field Type | Description |
| --- | --- | --- |
| Length | Unsigned 8-bit | Length of TEDS block. |
| TEDS Version | Unsigned 8-bit | TEDS version code |
| Module Function | Unsigned 8-bit | Sensor module function. |
| | | 1 = For TCM use only |
| | | 2 = Object 1 |
| | | 3 = Object 2 |
| | | 4 = Object 3 |
| | | 5–255 = Currently undefined |
| Module Serial Number | Unsigned 32-bit | Serial number of the module. |
| Channel Type | Unsigned 8-bit | Type of channel. |
| | | 0 = Sensor (input) |
| | | 1 = Actuator (output) |
| | | 2–255 = Currently undefined |
| Lower Channel Limit | Float 32-bit | Minimum physical value of channel |
| Upper Channel Limit | Float 32-bit | Maximum physical value of channel |
| | | Repeat outlined section for each channel. |
| Checksum | Unsigned 8-bit | Checksum computed on all previous fields. |

This information is utilized by the transducer control module to distinguish between plural transducers that may have the same function, and to permit additional transducers to be installed by the user at any time (e.g., without having to configure the transducer or transducer control module). An install button is disposed on the transducer control module housing to ensure that a single transducer control module responds to transducer actuation or installation as described below. In addition, the TEDS information indicates to other systems the manner in which to interpret transducer data to obtain parameter measurements.

Transducers 10 each basically include a low-power sleep state, an active state and an install state. The primary state is the sleep state, where the transducer preferably remains a majority of the time to maximize battery life. The transducer automatically enters the active state from the sleep state periodically (e.g., approximately every fifteen seconds) to sample sensing element input, to determine the presence of a state change for the monitored asset or object and to track the passage of time. The transducer inputs and outputs are organized as channels, where each monitored input is a sensor channel, and each output is an actuator channel. A state change occurs when an input for the monitored object changes between off and on conditions. When a state change is detected on any of the monitored channels, the transducer sends a channel update message or report to the transducer control module as described below. The transducer transmitter is not activated unless a message is to be transmitted in order to conserve battery power. After sending this message, the transducer waits for an acknowledge message from the transducer control module. The transducer may update an output channel or transmit additional information to the transducer control module in accordance with the acknowledge message type received. When an acknowledge message is not received within an appropriate time interval, the transducer returns to the sleep state and saves the message for later transmission.

The transducer control module is primarily in an awake state and can receive messages from the transducers at virtually any time. However, since the transducer is primarily in the sleep state, the transducer control module may only send messages to the transducer during the time interval where the transducer is awaiting an acknowledge message. The transducer control module buffers control and actuator channel messages (e.g., actuators are used to control objects, such as an output or switch) until the intended transducer initiates communications. The transducer further periodically transmits a status message to the transducer control module to indicate the state of its internal system (e.g., approximately every fifteen minutes to conserve power, but this may be adjusted by the transducer control module). This status message interval may be used to assign transmit time slots to transducers (e.g., which are typically asynchronous), and further sets the minimum update rate for actuator channels. During the status message update, the transducer control module may transmit control information to the sensor in an acknowledge message.

The install state is basically a separate mode that is entered when a transducer is being installed. In this state, the transducer is actively searching for a transducer control module. The transducer identifies itself to a transducer control module and provides corresponding TEDS information in order to be used in a network and be registered with that transducer control module. A transducer does not monitor input during registration, but does enter the sleep state between search requests. The various transducer states and operations are controlled by microcontroller 32.

Transducer LAN 12 can be wired or wireless. Preferably, the LAN uses a multi-drop architecture to support the use of plural transducers in a single system. Representative wired LANs include the EDC 1451.2-NA network node and the Controller Area Network (CAN) described in ISO 11898 and ISO 11519-2. Representative wireless LANs include the digital spread-spectrum units used in wireless home security systems and cordless phones, IEEE 802.11 (wireless Ethernet), and any one of a number of available wireless networking products intended for use with office computers and related equipment. The range and extent of the transducer LAN is generally limited to the equipment or premises being monitored. For yachts or other vehicles including boats and aircraft, this range can be limited to the vehicle being monitored, or it can encompass the entire marina, port, or airport. For industrial monitoring applications, it can encompass the entire factory or site being monitored. For homes, this range can be limited to just the premises being monitored, or it can encompass the entire neighborhood, development, or resort.

In the preferred embodiment, LAN 12 is wireless, while transducers 10 and transducer control module 14 employ wireless communications device 16 and a wireless protocol to communicate. Communications device 26 includes a receiver 34, a transmitter 36, an antenna switch 38 and an antenna 40. These components are typically implemented by commercially available or conventional devices. The receiver and transmitter are each connected to antenna switch 38 that provides access to antenna 40. Receiver 34 receives transmitted RF signals (e.g., approximately 432 MHz) from antenna 40 via switch 38 and converts those signals to digital signals compatible with microcontroller 32 for processing. Transmitter 36 receives data from the microcontroller and converts the data to RF signals (e.g., approximately 432 MHz) for transference to antenna 40 via antenna switch 38 for transmission. The receive and transmit lines between the microcontroller, receiver and transmitter are preferably serial having a bandwidth of approximately 4800 bits per second with data arranged having eight data bits, one stop bit and no parity bit (i.e., 8 N 1 format).

The communications between the transducers and the transducer control module are reliable due to the monitoring nature of the system. A wireless protocol employing on/off keyed (OOK) transmissions is employed to provide reliable communication at low cost between the transducers and transducer control module. Basically, the on/off keyed approach generates a signal when the transmitter is on, and is silent when the transmitter is off.

The protocol utilizes several techniques to reliably transmit data with the on/off keyed approach. In particular, the protocol implements Manchester encoding, message error checking and redundancy and carrier signal status checks. Manchester encoding converts data from single binary digits (e.g., a one or a zero) into two binary digits (e.g., a one-zero or zero-one pair). Although this technique increases the amount of data transmitted, the electrical characteristics of the RF signal are improved while effects of outside interference are reduced. In addition, this encoding scheme resolves ambiguities by requiring transmitters to send signals for each bit. For example, if a series of logical zeros are to be transmitted, the on/off keyed approach requires the transmitter to be silent. Thus, a receiver may not be able to determine whether or not a series of logical zeros is being transmitted or no message is transmitted. Similarly, a series of logical ones produces a continuous signal in the on/off keyed scheme, and a receiver may not be able to determine the presence of a message from interference or jamming. The encoding forces an on/off transition for each bit such that a receiver may receive and analyze signals to determine the presence of a valid message.

Error checking and redundancy requires that each transmitted message have an associated reply. When a message is transmitted and no reply is received, the message is re-transmitted. Further, the transmitted message and associated reply must include a valid checksum. The checksum ensures validity of data in a message, while messages and replies having invalid checksums are discarded.

In addition, the protocol ensures that only one transducer is transmitting at a time. In particular, the transducer monitors the status of the radio or wireless link to check for a carrier signal. The presence of the carrier signal indicates that another device is transmitting. This device may be a transducer or other device transmitting in the same RF band. When a carrier signal is detected by a transducer, the message is saved and transmission is attempted at a next active transducer state.

The protocol preferably utilizes packets to transfer data. An exemplary packet format is illustrated in Table II below, and includes a synchronization field, a source address field, a destination address field, a packet identifier field, a data length field, an optional data field and a checksum field.

TABLE II

Packet Format

| Field Name | Size (bytes) | Required | Description |
| --- | --- | --- | --- |
| Synchronization | 2 | Yes | Synchronization header. |
| Source address | 4 | Yes | Serial number of sender. |
| Destination address | 4 | Yes | Serial number of recipient. |
| Packet identifier | 1 | Yes | Type of packet. |
| Data length | 1 | Yes | Size of the data field. Zero indicates empty data field. |
| Data | 0 to 128 | No | Optional data. |
| Checksum | 2 | Yes | Fletcher checksum calculated on all packet fields except header. |

In particular, the synchronization field includes a synchronization header or pattern that is primarily used to provide a startup time for the transmitter and receiver. The pattern is two bytes and preferably contains the value 'FFFF' hexadecimal. The source address field contains four bytes of data that include the serial number (e.g., thirty-two bits) of the device (e.g., transducer or transducer control module) sending the message. The destination address field contains four bytes of data that include the serial number (e.g., thirty-two bits) of the device (e.g., transducer or transducer control module) to receive the message. This field is set to zero when a transducer is in installation mode, and typically contains the serial number of the transducer control module to which the transducer is registered. However, the field may contain the serial number of another transducer for peer to peer communications. The packet identifier field contains one byte and includes a code (e.g., eight bits) that indicates the type of information contained in packet. Exemplary packet identifiers are illustrated in Table III below.

TABLE III

Packet Identifiers

| Identifier Code (Hex) | Function | Data | Description |
| --- | --- | --- | --- |
| 10 | Sensor status or global channel report | Channel value list | The current value of each sensor channel. A list of the current value of every channel from 1 to n. Each value is the length specified in the TEDS. |

TABLE III-continued

Packet Identifiers

| Identifier Code (Hex) | Function | Data | Description |
|---|---|---|---|
| 12 | State change or single channel report | Channel number Channel value | Typically sent as a status message. The current value of the channel. Typically sent to indicate that a channel has changed to a new value. |
| 14 | Channel update request | Channel number | The sensor is requesting a new value for the specified channel. |
| 20 | Registration request | None | Sensor is requesting registration by a TCM. Sent when the sensor module is first powered on. |
| 22 | Send TEDS | TEDS | Sends the TEDS data for all channels to the TCM. |
| 80 | Acknowledge | None | Message received and processed. |
| 82 | Acknowledge with channel update | Channel number New value | Message received. Update the specified channel with the new value. Read only channels will not be affected. |
| 84 | Acknowledge with global update | New value list | Message received. Update each channel with the new value. Read-only channels will not be affected. Each value is the length specified by the TEDS. |
| 86 | Acknowledge with status interval update | Status interval | Message received. Update the status report interval for the sensor. The interval is set in increments of 15 seconds. (1 = 15 sec, 2 = 30 sec, 10 = 150 sec etc.) |
| 88 | Acknowledge with TEDS update | TEDS | Message received. Update the TEDS information for the sensor. |

The data length field contains one byte and includes the size in bytes of the optional data field. This field is set to zero if data is not included in the message. The maximum message length is one-hundred forty-two bytes. Transducers are not required to accommodate the maximum message size, and ignore messages having data length values that they do not support. The transducer control module supports messages of the maximum size. The optional data field contains a maximum of one-hundred twenty-eight bytes of data, or the amount permitted for the intended transducer. The checksum field contains two bytes including a checksum for the packet. The checksum is preferably a sixteen bit checksum that is determined by applying a conventional Fletcher checksum algorithm on packet data bytes except for the synchronization pattern.

FCC requirements indicate that the maximum transmission time for each communications device be approximately one second, where each device is silent for an interval approximately thirty times the transmission period or ten seconds, whichever is greater. This limits the amount of data that can be transferred, while other requirements limit the apparent transmitter power (e.g., power over time). The present invention protocol is designed to satisfy these requirements.

Packet data is transmitted with the least significant bits (LSB) first at a rate of approximately 4800 bits per second. The data format includes eight data bits, one stop bit and no parity bit (e.g., 8 N 1). The data is transmitted employing an on/off keyed (OOK) scheme as described above where the transmitter is on to represent a logic one and off to represent a logic zero. This scheme may provide ambiguities with respect to a series of logical ones or zeros as described above, and may increase apparent transmitter power for long intervals of continuous transmission.

The protocol employs pseudo-Manchester encoding to overcome these problems. In particular, Manchester encoding is typically used to encode the clock and data of a synchronous serial stream into a single bit of information, resulting in a logic level transition for each transmitted bit. Since the system is using asynchronous serial data, the transducer and transducer control module pseudo-encode the data in this scheme. Basically, each logical zero bit in a byte is transmitted as a one-zero pair, while each logical one bit in a byte is transmitted as a zero-one pair. An example of this encoding is illustrated in Table IV below.

TABLE IV

Manchester Encoded Data

| Binary Value | Hex Nibble | Encoded Binary | Encoded Hex |
|---|---|---|---|
| 0000 | 0 | 10101010 | AA |
| 0001 | 1 | 10101001 | A9 |
| 0010 | 2 | 10100110 | A6 |
| 0011 | 3 | 10100101 | A5 |
| 0100 | 4 | 10011010 | 9A |
| 0101 | 5 | 10011001 | 99 |
| 0110 | 6 | 10010110 | 96 |
| 0111 | 7 | 10010101 | 95 |
| 1000 | 8 | 01101010 | 6A |
| 1001 | 9 | 01101001 | 69 |
| 1010 | A | 01100110 | 66 |
| 1011 | B | 01100101 | 65 |

TABLE IV-continued

Manchester Encoded Data

| Binary Value | Hex Nibble | Encoded Binary | Encoded Hex |
|---|---|---|---|
| 1100 | C | 01011010 | 5A |
| 1101 | D | 01011001 | 59 |
| 1110 | E | 01010110 | 56 |
| 1111 | F | 01010101 | 55 |

This results in an approximate fifty percent duty cycle for the carrier signal, thereby reducing the apparent transmitter power. In addition, the encoding provides a logic level transition for virtually every transmitted bit. However, the amount of data transmitted increases with this encoding scheme. Generally, the system requires approximately 552 milliseconds to transmit the maximum sized packet (e.g., 142 bytes) and a maximum silent interval of approximately 16.6 seconds.

Figure 4:
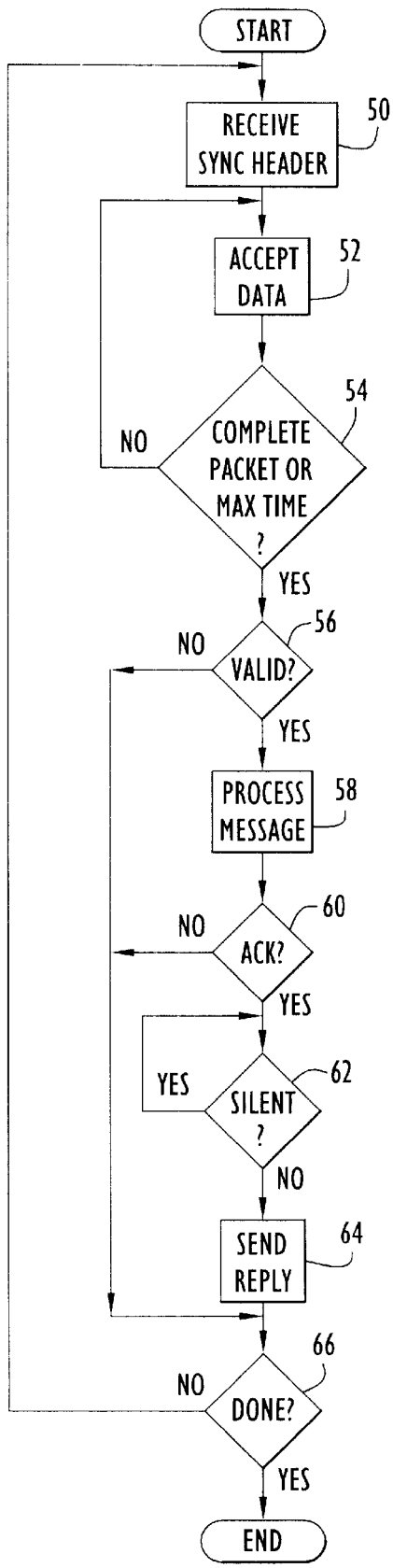
FIG. 4 is a procedural flowchart illustrating the manner in which messages are received in accordance with a wireless protocol according to the present invention.

The manner in which messages are received within the protocol is illustrated in FIG. 4. Specifically, a message synchronization header is received by a recipient (e.g., a transducer or transducer control module) at step 50. Data is accepted at step 52 until the complete packet is received or a prescribed time interval, preferably one second, has elapsed as determined at step 54. The message is decoded and inspected for validity based on the checksum. When a valid message is received as determined at step 56, the message is processed at step 58. If an acknowledgment is required to be transmitted to the sender is determined at step 60, the recipient waits until expiration of a silent interval as determined at step 62 and transmits the reply at step 64. After transmission of a reply, or if an invalid message has been received as determined at step 56, the recipient repeats the above process to receive additional messages. Similarly, if an acknowledgment is not required in response to a valid received message as determined at step 60, the above process may be repeated to receive additional messages as determined at step 66. If additional messages are not to be received as determined at step 66, the process terminates.

Figure 5:
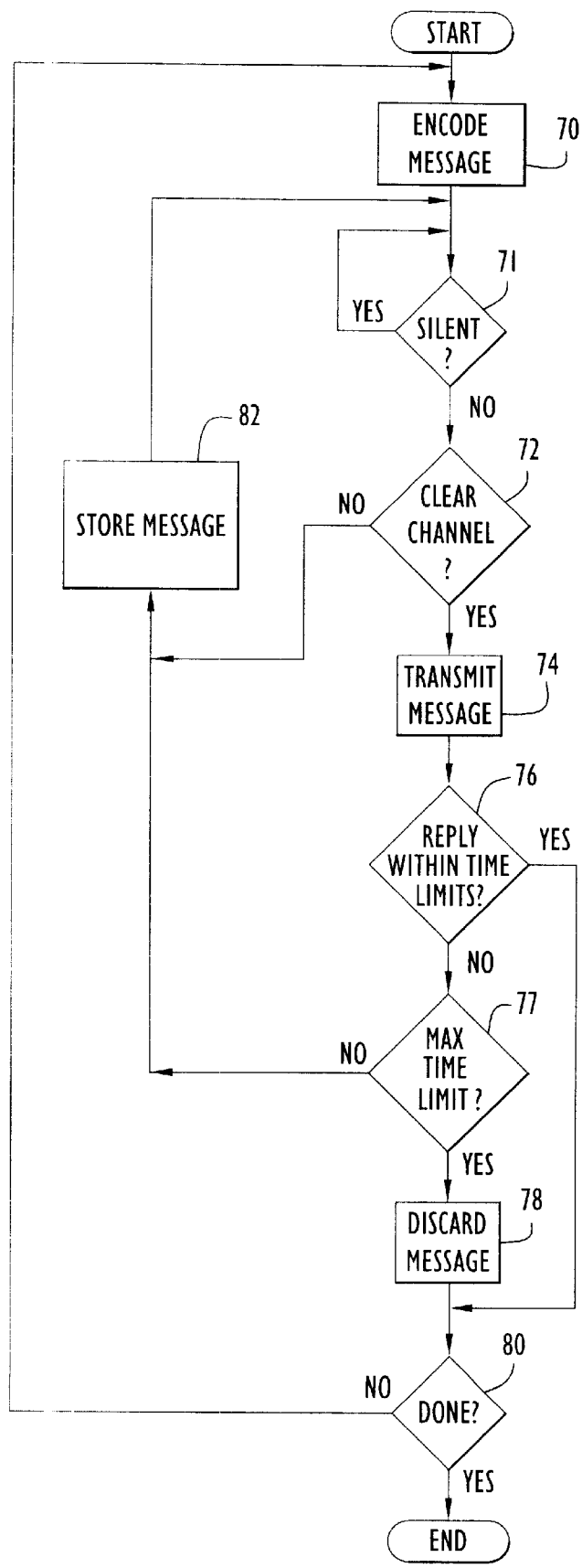
FIG. 5 is a procedural flowchart illustrating the manner in which messages are transmitted in accordance with the wireless protocol according to the present invention.

The manner in which messages are transmitted in accordance with the protocol is illustrated in FIG. 5. Initially, a message is encoded by the sender (e.g., transducer or transducer control module) as described above at step 70. The sender waits for an active state as determined at step 71. Prior to transmission, a sender listens during a prescribed interval, preferably 250 milliseconds, to determine the presence of a clear channel at step 72. If a clear channel is determined, the message is transmitted at step 74. If the channel is not clear as determined at step 72, the sender stores the message at step 82 and enters sleep mode to wait for the next interval to enter an active state and attempt re-transmission. Transducers generally may store only a single message, where a second message may not be stored until the first message is removed. After a message is transmitted at step 74, the sender waits for a reply. If a reply is not received within a prescribed time interval, generally two seconds, as determined at step 76, and the prescribed reply interval, preferably fifteen minutes, has not expired as determined at step 77, the message is re-transmitted at prescribed intervals during the active state approximately every fifteen seconds. When a reply is not received within the prescribed reply time interval, the stored message is discarded at step 78. After discarding the message, or if a reply is received within the time interval as determined at step 76, the above process may be repeated to transmit additional messages as determined at step 80; otherwise the process terminates.

The transducers typically operate as a master device to permit the transducers to remain in the sleep state a substantial portion of the time. The transducers may request a channel update from the transducer control module or channel update information may be sent to a transducer within an acknowledge packet. In addition, new TEDS may be sent to a transducer within an acknowledge packet.

Each transducer is registered with a corresponding transducer control module. Registration occurs during the first enablement of the transducer. Initially, transducers may be installed by users at any time. Accordingly, plural transducer control modules may receive request messages from a transducer, thereby enabling a transducer to register with an incorrect control module. In order to overcome this problem, the control module only responds to registration requests when manually placed in an installation mode. This mode is initiated by an install button disposed on the transducer control module front panel or housing. The transducer attempts registration in response to an initial power-up and registration requests occur as part of normal battery maintenance of transducers. Since transducers default to the last known control module in response to a failed registration attempt, registration is not required subsequent to replacement of a transducer battery.

Figure 6:
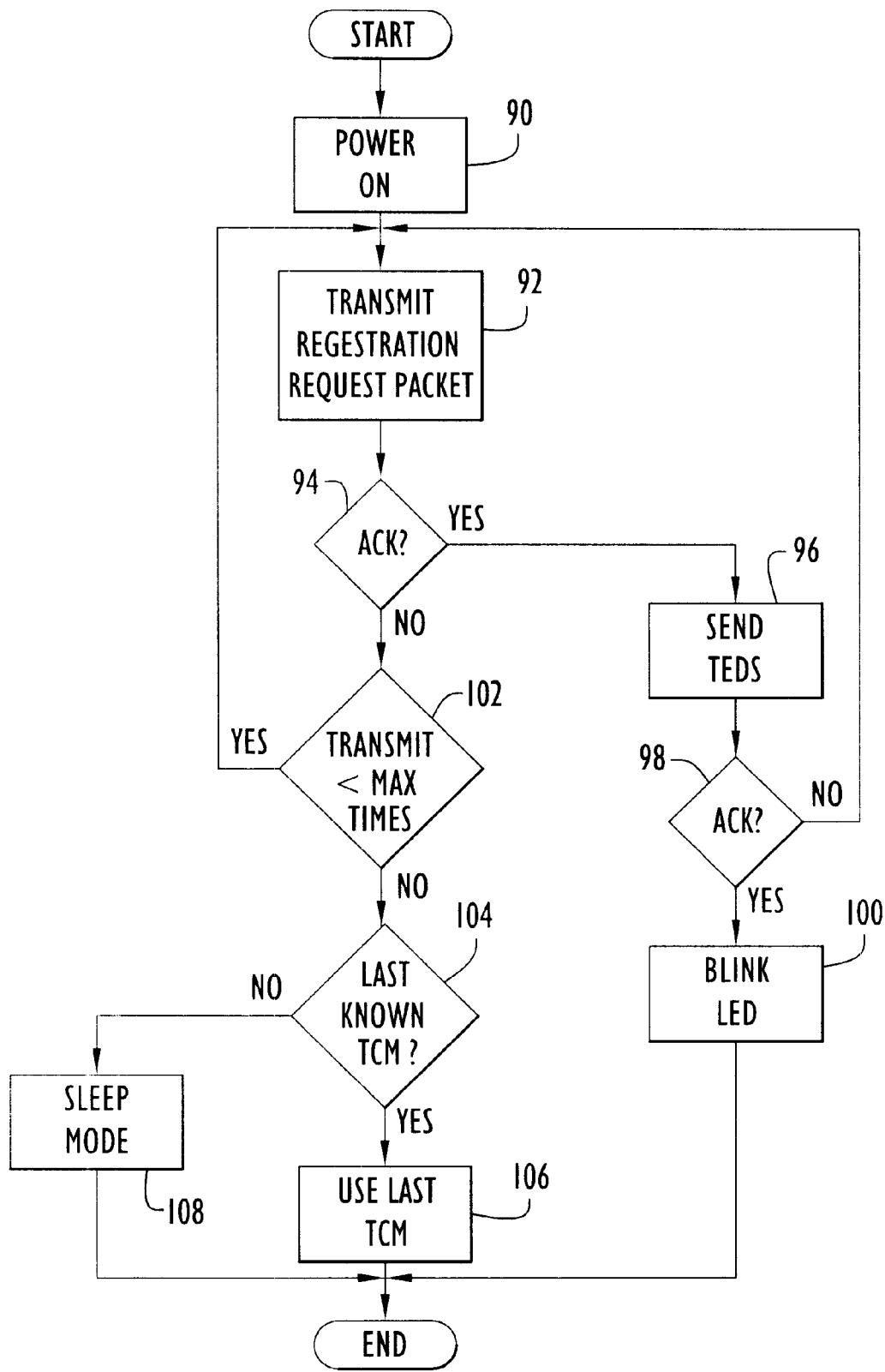
FIG. 6 is a procedural flowchart illustrating the manner in which a transducer is registered with a transducer control module according to the present invention.

The manner in which registration is accomplished is illustrated in FIG. 6. Specifically, power is enabled to a transducer at step 90 and the corresponding transducer control module is placed in installation mode as described above. The transducer transmits a registration request packet at step 92. The destination address field is set to zero to indicate that the transducer is searching for a control module as described above. If an acknowledge message is not received as determined at step 94, the packet may be transmitted for a maximum amount of times, preferably eight, as determined at step 102. If an acknowledge message is received by the transducer after verification by the transducer control module receiving the message, the transducer sends its TEDS information to the transducer control module at step 96 to identify itself to the control module. When an acknowledgment is received in response to the TEDS information as determined at step 98, the transducer indicates registration at step 100 by blinking LEDS approximately four times at approximate half-second intervals. The transducer control module generates an installation message for transmission to the monitoring system to indicate the newly installed sensor. The appropriate information is stored in the monitoring system database as described below to enable reporting of the new sensor to an end-user. If a TEDS acknowledgment is not received as determined at step 98, the transducer re-transmits registration request packets a described above.

When an acknowledgment is not received with the maximum transmissions of a registration request packet as determined at step 102, the transducer utilizes the previous transducer control module at step 106. If the transducer does not have a prior control module (e.g., at initial power-up from manufacture) as determined at step 104, the transducer enters sleep mode at step 108 and requires a power cycle to restart the above registration process.

Figure 7:
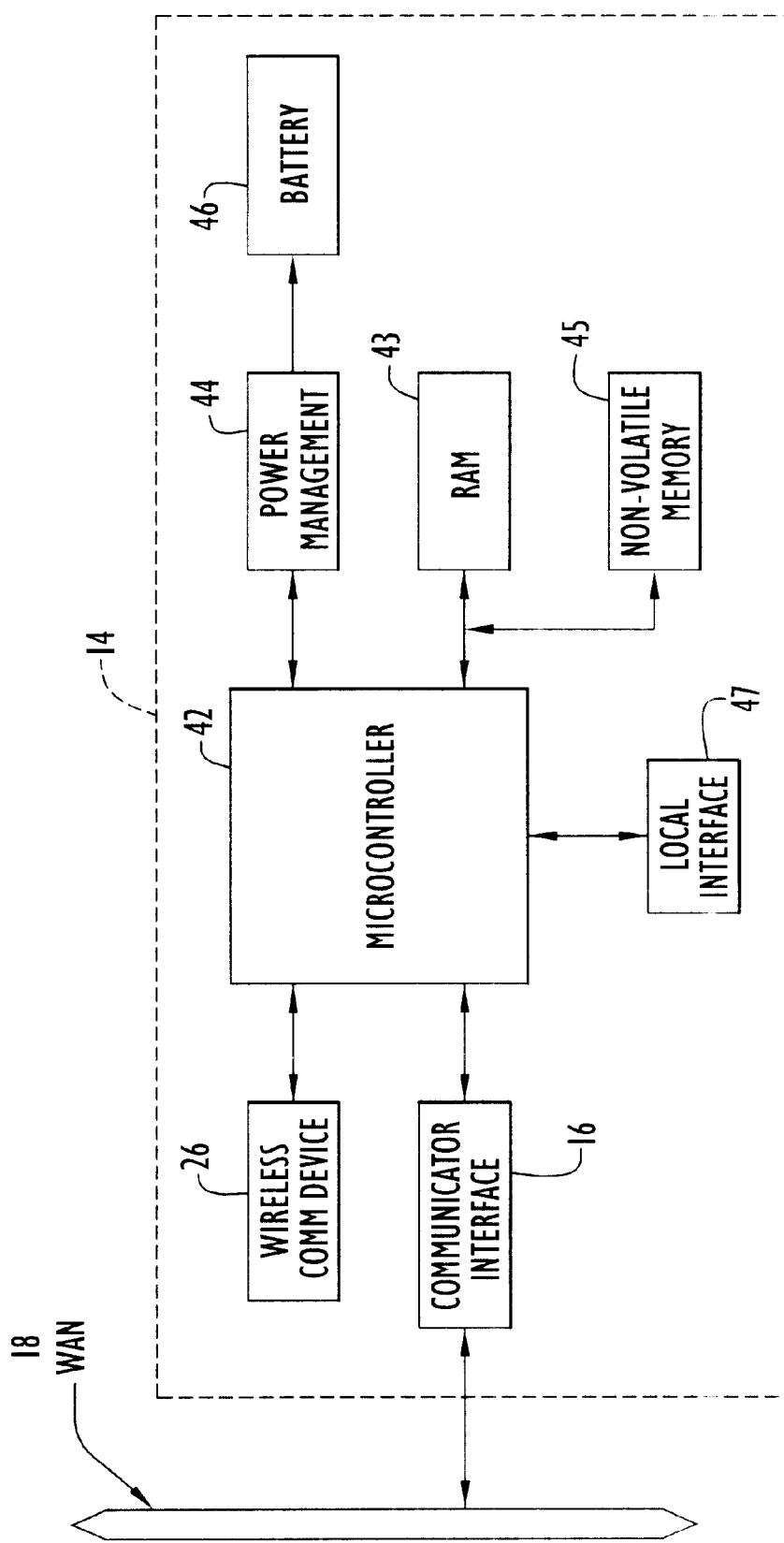
FIG. 7 is a schematic block diagram of the transmitter control module of FIG. 1 according to the present invention.

Transducer control module 14 includes the physical and protocol interface to the transducers over sensor LAN 12, the event detection and reporting logic, and the physical and protocol interface to communications device 16. The transducer control module can be implemented as an application specific device having a microprocessor, memory and appropriate communication ports, or as a standard personal computer running application specific software. A preferred embodiment of transducer control module 14 is illustrated in FIG. 7. Specifically, the transducer control module includes a microcontroller 42, wireless communications device 26, communicator interface or communications device 16, RAM 43, non-volatile memory 45, power manager 44 and a battery 46. The microcontroller controls the overall operation of the control module and communicates with the transducers via wireless communications device 26. By way of example only, the microcontroller is implemented by an Atmega 103 processor manufactured by Atmel. The communications device is substantially similar to the device described above for the transducers, while the microcontroller implements the wireless protocol. Communicator interface 16 provides communication between the transducer control module and WAN 18 for communication with monitoring system 20. The interface may be internal or external (e.g., as shown in FIG. 2) of control module 14 and may be a separate or integral component. The microcontroller includes internal storage for software and typically utilizes RAM 43 for working storage. Non-volatile memory 45 typically stores configuration information for the transducer control module. Power manager 44 is coupled to an object, such as battery 46, to monitor the battery and a power charging system for a host environment (e.g., boat or vehicle battery, shore power, etc.). Local interface 47 provides an end-user with direct access to the transducer control module from a computer system or other device to query the control module or set parameters. The various components (i.e., interface, power manager, memories, microcontroller) of the control module are typically implemented by conventional or commercially available components.

The transducer control module is generally local to the object being monitored and has two-way communications with the monitoring system and transducers. The control module further makes decisions based on user-defined rules, and may monitor parameters of the object (e.g., temperature or power source). The use of local decision making capability reduces message traffic between the monitoring system and monitored asset.

The transducer control module may communicate with the monitoring system via any conventional or commercially available communications system, such as cellular modems, wireless Ethernet, wired Ethernet, satellite modems, telephone line modems, routers and interface cards. By way of example only, a satellite modem is utilized as interface 16 to communicate with a satellite network, such as Orbcomm, serving as WAN 18 between the control module and monitoring system. The satellite network generates an e-mail message that is sent to the monitoring system for storage and processing. The transducer control module may collect data from each transducer at predetermined intervals corresponding to a default sample rate or a user-defined sample rate. Preferably, the module will gather the current absolute level from the transducer and keep a running average so that the difference between the current level and the long term average level can be determined, for example to identify shock loading conditions and other transient conditions. Root mean square (RMS) levels can also be calculated and stored by the module, e.g., to evaluate vibrations. The module is preferably programmed to generate and send messages to monitoring system 20 when measured levels exceed user-defined or default thresholds. Message-generating events can also be defined by combinations of thresholds which are exceeded so that, for example, if the level on channel one exceeds some first number and the level on channel two exceeds some second number, an event message is generated by the transducer control module and sent to the monitoring system. The module memory may be partitioned and detailed information on an event may be stored in one of the partitions for later analysis. The message preferably includes a summary which quantifies the event so that the monitoring system can decide whether or not to send an alarm as described below.

In addition, the connection between transducer control module 14 and monitoring system WAN 18 can be either wired or wireless, or a combination of both. Representative wired WANs include Ethernet, telephone dial-up connections, and the complex communications network commonly referred to as the Internet. Representative wireless WANs include wireless Ethernet (IEEE 802.11), cellular telephones, radio-telephone systems, and commercially-available satellite-based communications systems. The data transmitted over the WAN can be encrypted to prevent unauthorized access.

The transducer control module performs several tasks including identifying newly installed sensors, determining the type of sensor and storing its data and acting on stored data based on conditions from the monitoring system (e.g., event detection). The event detection logic basically monitors transducer data for reportable events, prepares event and status reports described below in the appropriate format for interface 16, controls interface 16 to conserve bandwidth and battery power and sends the event and status messages or reports to the monitoring system. Event reports notify the monitoring system of a change in the monitored asset that requires action, while status reports are periodically transmitted to update status information about the system.

Events are defined as changes in a monitored input (of a transducer) that result in performance of an action. An event report is sent to the monitoring system when the transducer control module detects a valid event. The transducer control module, based on transducer TEDS information, knows the parameters being measured and can link measurement data to defined events to detect occurrence thereof. The monitoring system may be notified of the time, date and Global Positioning System (GPS) location of the event. Event reports typically do not include identification information in order to reduce communications overhead, but rather indicate that a particular event has occurred. The monitoring system determines the meaning of the event report based on the control module serial number in a message header (e.g., e-mail header) and account information in the monitoring system database.

By way of example only, event reports include sixteen formats, while the transducer control module may store a maximum of sixteen event reports. In addition, a single event may include many different monitored inputs or outputs, each referred to as a term. The terms may be weighted, while events may be added, deleted or modified by users via the end-user terminals connected to the monitoring system. When an end-user modifies an event, the monitoring system sends an event definition to the transducer control module that includes information describing the event including the number of terms, input channels and type of event report. The message is typically transmitted through the satellite network to the transducer control module that stores the message for processing. The transducer control module typically receives the message via e-mail as described above and periodically checks for e-mail messages, preferably every fifteen minutes, to update event definitions.

Status reports are periodically transmitted at scheduled intervals and may contain any information available to the transducer control module. By way of example only, a status report may be transmitted daily (e.g., at midnight) and report various object characteristics. Generally, sixteen formats are available for status reports, while the transducer control module may store a maximum of sixteen status reports. Status reports are configurable by an end-user, where the monitoring system generates a report definition for the transducer control module when an end-user modifies a status report. The report definition includes information that describes the status report to the transducer control module. Since the status reports do not include identification information, the monitoring system determines appropriate actions based on information in the monitoring system database.

As described above, the transducer control module is in communication with the transducers and constantly monitors the wireless network for incoming messages. Since the control module is a slave device, it does not initiate communications with the transducers. When a transducer reports the condition of an input, the control module transmits an acknowledge message that may include a request to update an output channel or return additional status information.

The transducer control module uses transducer data as a basis for determining and reporting events. The transducer data is arranged into channels, where each transducer generally has two channels, but may include a maximum of 255 channels. Further, transducers may require a run-time calculation, where run-time refers to the amount of time a transducer reports an on state for a particular input. This calculation is performed by the control module automatically when a run-time transducer is recognized based on TEDS information. The run-time information is incorporated as a new channel for the transducer in the control module and monitoring system. In addition, some transducers require a cycle count channel. The transducer control module further calculates this value and incorporates the channel into the transducer information.

The transducer control module further provides time, date and location stamping for event and status reports. Time stamps, within an approximate one second interval, are provided internally by the transducer control module, while other time and data information is provided by an external GPS receiver. The GPS system further provides the location of events. The transducer control module utilizes UTC (Coordinated Universal Time) or GMT (Greenwich Mean Time) while differences between an end-user time zone and UCT are corrected by the monitoring system at the time of display. In addition, the transducer control module monitors the primary power source of the asset. If the power source fails, the control module includes an internal battery backup to transmit a power fail report to the monitoring system. The power backup enables the control module to operate for several days in the event primary power is not promptly restored.

Monitoring system 20 includes computer hardware and software which receives, stores, and analyzes event and status information from the item or facilities being monitored. The monitoring system watches for, detects, and reports trends in the monitored data, as well as detecting when the alarm conditions have been met. The monitoring system is the principal interface between the overall system and the end-user. It is the sub-system with which they interact to receive status reports, program event and alarm conditions, and issue control commands to actuators. The monitoring system provides for multiple users and multiple levels of access to the reports and information for the monitored facilities. Preferably, each end-user is provided access to the information for their monitored facilities and none other. End-users are able to designate multiple levels of access for themselves and in turn their staff or clients. For example, a trucking company can authorize their customers to receive simple location and shipment status reports, but not reports on equipment condition or driver performance. Similarly, the maintenance facility can receive the equipment reports, but not information on shipments or the driver. These security provisions and access levels are selectable by the end-user through their interface with the monitoring system.

Figure 8:
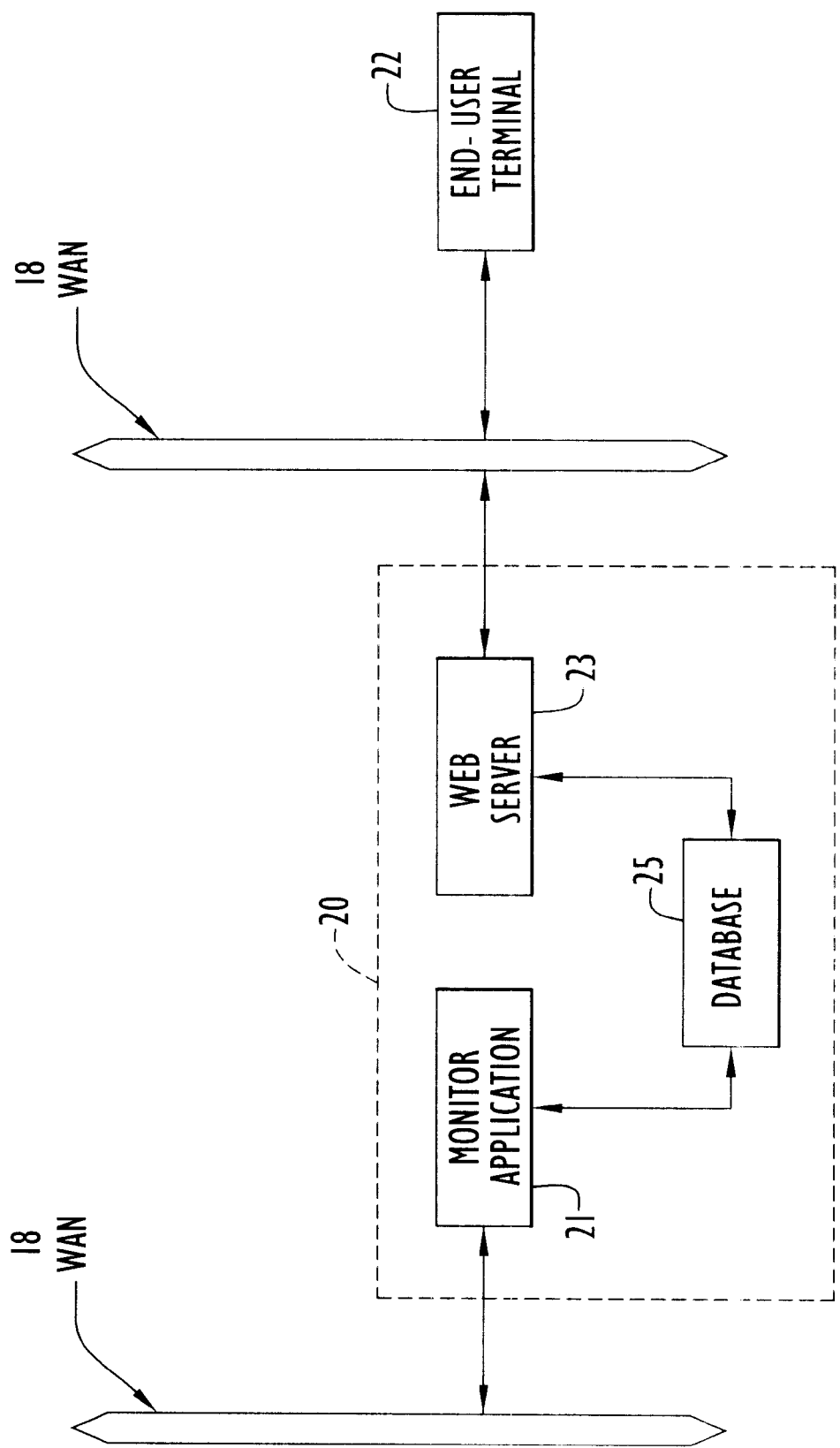
FIG. 8 is a block diagram of the monitoring system of FIG. 2 according to the present invention.

A preferred embodiment of monitoring system 20 is illustrated in FIG. 8. Specifically, monitoring system 20 includes monitor application 21, a database 25 and a web server 23 allowing the end-user to interact with the monitoring system over the WAN, such as the Internet, using commercially available software known as web browsers. This enables end-users to receive event reports and check the status of the monitored facilities from anywhere in the world without requiring special communications facilities or having to install special software on their local computer. Standard capabilities of web servers and browsers, such as secure sockets layer (SSL) service, can be used to provide the required security and data access controls. The monitor application and web server each access database 25.

The monitoring system is typically implemented by a conventional personal or other computer system. The computer system may include any of the major platforms or operating systems. By way of example only, monitoring system 20 includes a Microsoft Windows NT Server 4.0 operating system, and Microsoft Internet Information Server version 4.0 in web server 23. Database 25 is typically implemented by Microsoft Access 2000, but may utilize any conventional database. The web server further utilizes Microsoft Active Server Pages Scripting to send SQL queries to the database. Connection to the database is accomplished by the web server and monitor application via open database connectivity (ODBC).

Monitoring system 20 basically coordinates communications between a system web site, database and transducer control module. Communication between monitor application 21 and the transducer control module is preferably via e-mail as described above. Web server 23 and database 25 transfer information via ODBC and Active Server Pages scripting. Monitor application 21 periodically checks for e-mail messages from transducer control modules, or may retrieve messages from a server. When messages are received, they are processed and stored in the database based on user accounts by monitor application 21. When a message includes measurement data, the transducer data is arranged by the transducer control module into channels, where the monitoring application knows the data represented in the channels for proper storage in the database. If the message defines an alarm condition, a notification (e.g., e-mail, fax, pager, etc.) is sent to each person residing on a notification list for that event stored in the database as described below. When a user creates or modifies report and event definitions via the web site, new definitions are sent to the transducer control module. Monitor application 21 periodically checks database 25 for new definitions and transmits e-mail messages to the appropriate transducer control modules.

Monitor application 21 maintains an event log, an alarm notification log and an e-mail log. The application records into the event log each event that occurs along with time stamps indicating the time the event occurred (UTC), the time the event report was received by the monitoring system and the time the event processing and logging was completed. When alarm notifications are sent, the monitor application records into the alarm notification log the time of notification. Further, alarm messages may be displayed at the web site so that a user may receive them immediately upon entering the system. The time at which a user acknowledges receipt of the message is further recorded into the alarm notification log for each alarm. In addition, monitor application 21 records in the e-mail log each e-mail message that is received and processed. Report and event definition messages that are sent to transducer control modules are also recorded in the e-mail log.

Figure 9:
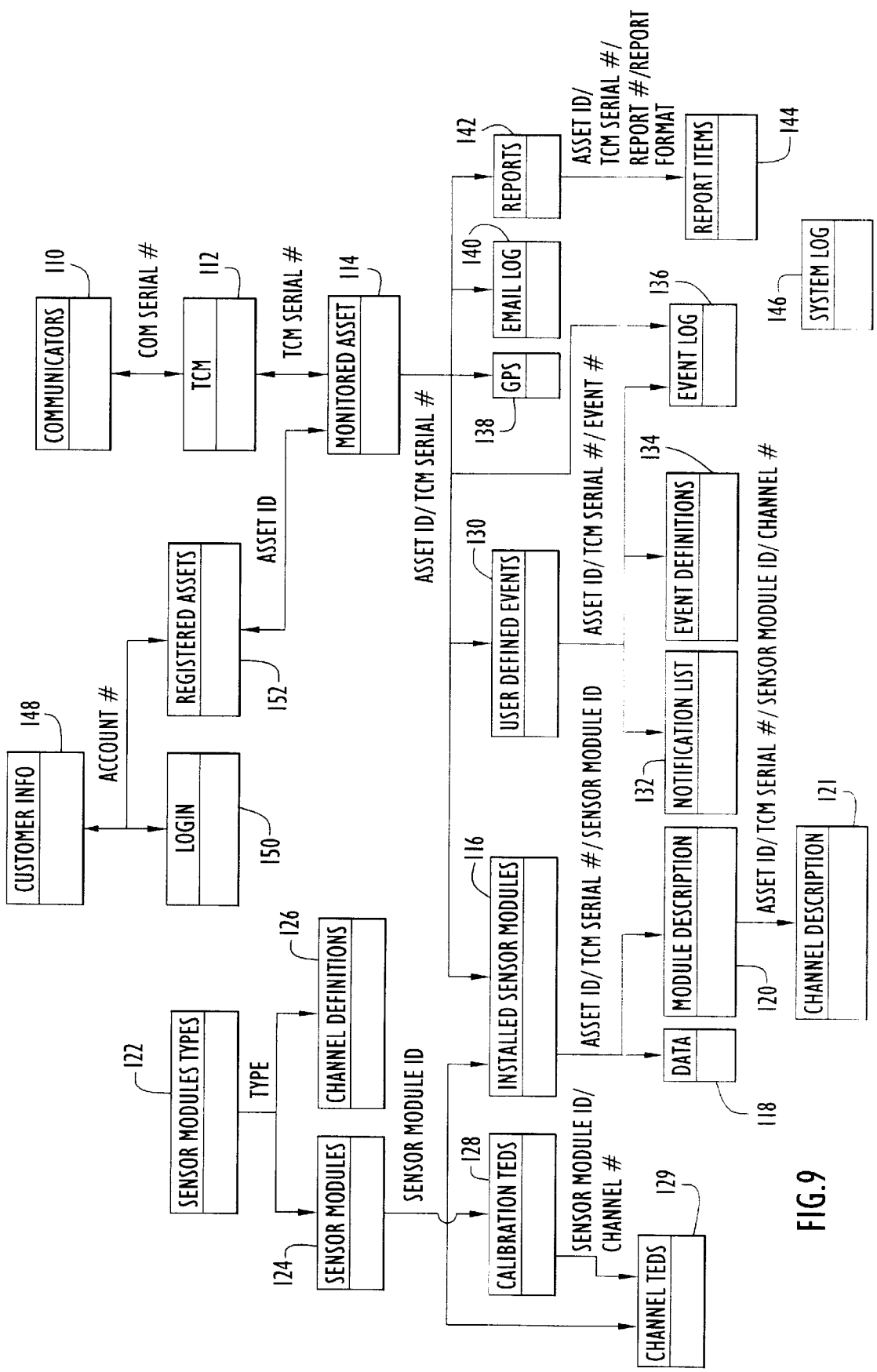
FIG. 9 is a diagrammatic illustration of the association of data tables within the database of FIG. 8.

Database 25 typically includes several tables to store system information as illustrated, by way of example only, in FIG. 9. Initially, hardware information is entered into the database during manufacturing and assembly phases. Specifically, communicators table 110 is a master index of satellite communicators used in the system. This includes information relating to a unit serial number, registration date and e-mail address assigned. TCM table 112 is similarly a master index table of transducer control modules and includes information relating to the manufacturing date, firmware version, unit serial number and unit serial number of corresponding satellite communicator with which that control module is packaged. The communicator serial number is entered in the database for each control module at the time the control module and communicator are assembled. The communicator serial number is the primary key for linking an e-mail address to a communicator and for linking the communicator to a transducer control module. The transducer control module serial number is used by a user to register a monitored asset and is the primary key for linking the hardware to an asset. An asset identification number (Asset ID) is the primary key for linking an asset to a user account number.

Sensor module types table 122 is a master index of transducers and includes the sensor module ID (e.g., serial number), manufacture date and type of sensor module. The type is a primary key linking a sensor module to sensor modules table 124 and channel definitions table 126 collectively containing information about the hardware configuration for that type of sensor including the quantity of channels and a description of each channel. The sensor module ID is the primary key for linking each transducer to calibration data in calibration TEDS table 128. The combination of the sensor module ID and channel number links a transducer to channel TEDS table 129 including the range of possible values and physical units of measurement for the transducer data.

Customer information table 148 stores customer information including a unique customer account number. Login table 150 is utilized to link a customer's name and password with the account number. An account may have several assets, each of which is identified by a unique asset identification number (Asset ID). An asset is registered by a user entering a name and asset description at the web site. The asset is assigned a unique Asset ID and the information is stored in registered assets table 152. The account number is the primary key that links customer information table 148 to registered assets table 152. Once an asset is registered to an account, a user registers the control module serial number for that asset via the web site. Registering basically creates an association between the asset and a physical, e-mail addressable, control module. The asset is considered a monitored asset and is stored in monitored asset table 114. This table includes information relating to the asset monitoring system hardware, such as Asset ID, control module serial number, system status, quantity of transducers installed for the control module and quantity of events and reports defined for the control module.

The Asset ID is the primary key for linking a registered asset to control module serial numbers stored in monitored asset table 114. An asset may have plural control modules registered to it, each having a corresponding group of transducers. Thus, the combination of the Asset ID and control module are primary keys for linking to tables containing configuration settings and data related to the asset and control module pair and corresponding transducers.

After transducers are installed for a control module, information about the transducers including the sensor module ID is stored in installed sensor modules table 116. The primary keys linking the Asset ID and control module to corresponding installed transducers are the Asset ID and control module serial number. The combination of the Asset ID, control module serial number and sensor module ID are the primary keys linking the Asset ID and control module pair to data table 118 containing actual channel data and module description table 120 containing descriptions of transducers. These keys in further combination with a channel number link to channel description table 121 containing channels customized by the user. The Asset ID and control module serial number are the primary keys for linking to GPS table 138 containing GPS position data for the asset and control module.

The Asset ID and control module serial number are the primary keys linking to user defined events table 130 containing user defined events including the quantity of terms defining the event and whether or not the event should trigger an alarm. The combination of the Asset ID, control module serial number and event number are primary keys linking to event definitions table 134 containing the individual terms comprising the event definitions, while these keys, for events that trigger alarms, link to notification list table 132 containing notification lists for sending messages when an alarm condition is detected.

The Asset ID and control module serial number are the primary keys linking to reports table 142 containing user defined reports to be generated by the monitoring system including the quantity of report items and the schedule on which the reports are to be sent. The combination of the Asset ID, control module serial number, report number and report format are primary keys linking to report items table 144 containing individual items that comprise the report definitions.

The Asset ID and control module serial numbers are the primary keys for accessing e-mail log table 140. This table contains a log of e-mail messages (e.g., events, reports and configuration messages) sent and received by each control module. These keys may further be utilized and/or combined with an event number to access event log table 136. The event log table contains a log of event messages and alarm notifications sent by the control module (e.g., whether or not the notifications are acknowledged by the user). System log table 146 records internal information (e.g., program errors, events, etc.) that occur during monitoring system execution.

Referring back to FIG. 8, end-user terminals 22 are generally standard personal computers with web browser software and are connected to the monitoring system through a WAN, such as the Internet. This permits access to the monitored information form anywhere in the world that has Internet access, without having to install special software on each computer used for access to the monitoring information. Alternatively, the end-user terminals can be personal computers running special software developed for the above purpose, dumb terminals connected to a network or a mainframe, personal information managers and digital assistants, pagers, cellular phones, etc. End-user terminals 22 typically interact with web server 23 to provide information to an end-user. Monitor application 21 generally executes in the background to store transducer information in the database and correspond with the transducer control modules to provide event definitions and receive the transducer reports and information as described above. Web server 23 utilizes Active Server Pages with Visual Basic scripts that execute within the web server to build web pages containing the information for display to a user. In response to entered information, the scripts essentially retrieve the desired monitoring information from database 25. The monitor application and web server each access (e.g., read and write), and indirectly communicate information to each other through, the database. The resulting web pages are transferred to end-user terminal 22 for display. The database further maintains the format of the web pages desired or specified by the user for display.

The user may specify various characteristics or parameters for system operation via the web site. For example, the user may specify: names for monitored data, particular notifications for alarm conditions (e.g., when to notify, manner of notification, events triggering notification, etc.), devices to be turned on or off, layout of web page, and the particular transducers from which information is to be displayed. This information is stored in database 25. When events are entered, the terms are stored in the database, and monitor application 21 periodically checks for new or modified events to transmit the appropriate messages to corresponding control modules as described above.

Figure 10:
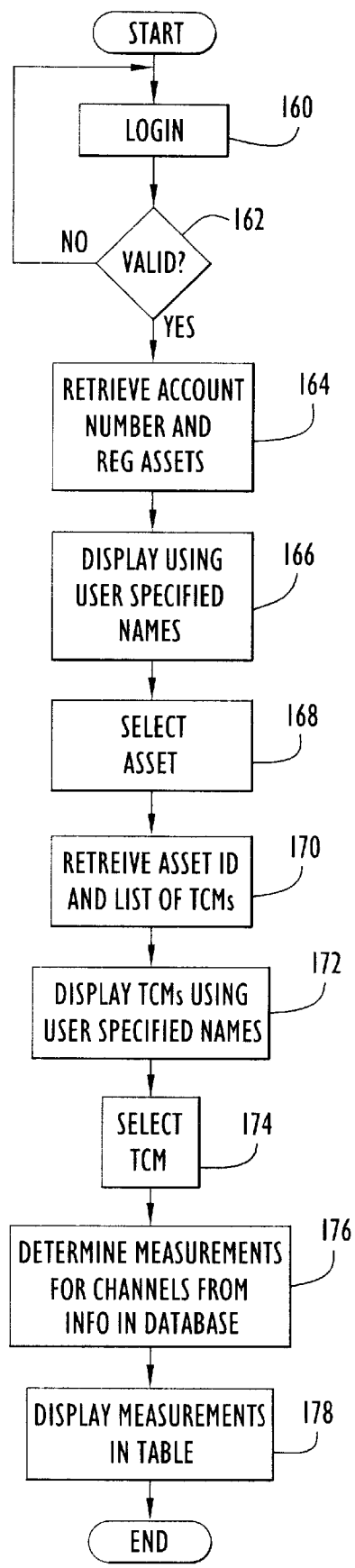
FIG. 10 is a procedural flowchart illustrating the manner in which the monitoring system processes user requests according to the present invention.

The manner in which web server 23 processes user requests and displays monitored information is illustrated in FIG. 10. Specifically, a user logs onto the web site by entering a username and password at step 160. The username and password are utilized to retrieve an account number from the database and validate the account at step 162. If invalid information is entered, the user is prompted to repeat the login process. When a valid account is determined at step 162, the account number is utilized to query the database for registered assets of that account at step 164. A list of assets having user specified names (e.g., specified by the user during asset registration) is displayed to the user at step 166. The user selects a displayed asset at step 168, and the selected asset name is used to query the database at step 170 to retrieve an Asset ID and a list of transducer control modules that are registered for the selected asset. A list of control modules having user specified names (e.g., specified by the user during control module registration) is displayed to the user at step 172.

The user subsequently selects a displayed control module at step 174 and measurements from the selected control module are determined at step 176. This is accomplished by using the selected control module serial number and Asset ID to query the database to retrieve the quantity of transducers installed for the selected control module, the unique sensor module ID and the current status of each transducer (e.g., active or inactive). Active transducers are reporting data, while inactive transducers are transducers that have been installed, but are either removed or not responding at the time of the most recent sensor report. The sensor module ID is used to query the database to retrieve information relating to transducer type (e.g., temperature, voltage, etc.), the quantity of channels and description of each channel. The sensor module ID and channel number are subsequently used to query the database for the channel TEDS and calibration TEDS information. This provides calibration coefficients and physical units of measurement to facilitate determination of the actual data value for a channel.

Once channel data is determined for each transducer of the selected control module at step 176, a table is displayed including the transducer and channel descriptions (e.g., user-specified descriptions) and corresponding measurements at step 178. In addition, the user may, via the web site, define events to be reported by each transducer by selecting the transducer and specifying the conditions. Custom reports may further be defined by the user and request data for one or more transducers at certain intervals. Newly defined or modified events and reports are stored in the database and indicated accordingly. The monitor application periodically polls the database for new or modified definitions for transmission to the control module as described above.

Operation of the remote monitoring system is described with reference to FIGS. 1–2. Initially, the end-user obtains (purchases, leases, etc.) a smart remote monitoring kit. The kit includes a basic suite of transducers 10 for the selected application, a transducer control module 14, a communicator 16 for interfacing the transducer control module to the WAN of choice, and complete instructions for installation and activation. A default user name and password can also be supplied for use in activating the monitoring account. Alternatively, the transducers and control module may be available separately or in any combination. The end-user installs (or has installed) the monitoring kit by placing the transducers at appropriate locations and/or connecting them to corresponding components, and disposing the control module locally with respect to the transducers. As part of this installation, the communicator is connected to (for wired systems) or makes contact with (for wireless systems) the WAN.

Monitoring system 20 recognizes and validates the unique identifier of the transducer control module and starts receiving and processing event reports and status information. The end-user contacts the monitoring system through an end-user terminal 22 using, for example, the Internet and a web browser. The end-user activates the monitoring account, makes arrangements for payment of monitoring fees (e.g., by deposit account, credit card or applying for a corporate account), defines the desired alarms and status reports, and defines the distribution list (e.g., names, telephone numbers, e-mail addresses, etc.) for messages as described above. The monitoring system continues to receive event reports and status information from the transducer control module, and processes them according to the options selected by the end-user when the account was activated. The end-user may purchase additional transducers for use with the smart remote monitoring system. When installed and connected to the transducer control module, these optional transducers identify themselves to the transducer control module and, in turn, to the monitoring system as described above. The monitoring system recognizes the additional transducers, knows what they are, and what data and reports they can provide. It adds the new transducers to the user account. The end-user contacts the monitoring system through end-user 22 terminal as described above and selects the monitoring options appropriate to the additional transducers.

At any time, the end-user can contact the monitoring system through an end-user terminal to view monitored information and update information (e.g., the alarm conditions, status reports, distribution lists, access controls, etc.) as described above.

Some of the advantages of the remote monitoring system and method according to the present invention is that it can be internet based allowing end-users to interact with the system from anywhere in the world without the need for special equipment, communications facilities, or software; that it provides real-time, on-demand status information, not just alarm notifications so that end-users can check on monitored facilities at any time, from anywhere; that the transducers and transducer control modules are self-identifying so that once connected, the monitoring system knows what the sensors are and what to do with the information they provide and end-users can simply install and connect new transducers or control modules, with the monitoring system immediately accepting data reports; that all transmitted messages can be encrypted to control access to event reports and status information; that all features, including event detection thresholds, alarm conditions, alarm notification actions, lists and addresses, information access, etc. are user programmable by direct interaction with the monitoring system; that the system and method provides direct notification to the end-user using the communications media, addresses or telephone numbers, and message format selected by the user so that, for example, in the case of a yacht, messages can be sent to the boat owner, the charter operator, the boat's home marina, and the customary maintenance facility, depending on the content of the message and the options selected by the user; and that any or all of the above can occur automatically, without human intervention on the part of the monitoring service.

It will be appreciated that the embodiments described above and illustrated in the drawings represent only a few of the many ways of implementing a smart remote monitoring system and method.

The transducers may be implemented by analog or digital sensors, and may further include processors and/or circuitry to process measured signals to provide a "smart" transducer. In addition to an actual sensing element, the transducers may include signal conditioning electronics, an analog to digital converter, a digital communication interface and TEDS to provide plug-and-play capability and other features such as temperature compensation and correction, and decision making capability. For example, changes in trends for any of the above sensors, such as a significant change in how long or how often the bilge pump runs, can be cause for an alarm notification. The transducers may include sensors to receive input and/or actuators to control systems or to enable or enhance the sensor measurements. For example, an actuator can be used to disconnect the battery charger in order to measure the true voltage of the battery. The transducers may be positioned at suitable locations to provide corresponding measurements, and may include any conventional or other fastening devices. Further, the transducers may include any conventional or other connectors to facilitate measurement of a desired parameter (e.g., voltage, device status, etc.). The transducers may include any type of sensing element to measure any type of characteristic (e.g., voltage, temperature, device status, etc.), and may receive power from any conventional or other power source (e.g., battery, electrical generator, common wall outlet jack, etc.). The transducer may include any conventional or other microcontroller, processor or circuitry to control transducer operation. The electronic data sheet may include any quantity or type of information relating to a transducer(e.g., type, calibration information, measurement units, etc.). The sensor interface may be any conventional or other device for providing signals from the sensing element compatible with the microcontroller or other circuitry (e.g., digital-to-analog converter, etc.). Any quantity of transducers having any types of sensing elements or intelligence may be utilized to monitor an object.

The transducers may communicate with the transducer control module via any wired or wireless communication medium. The transducer identification (UID) may include any quantity of any type of alphanumeric or other characters or symbols. The transducers may include any quantity of states, and switch between the states in any desired fashion. The transducers may further be arranged to be slave devices and respond to transducer control module requests. The transducer data may be arranged on any channel or quantity of channels in any fashion. The transducer may have any quantity of channels, while the channels may be arranged in any fashion. The transducers may detect or measure any state changes or values of an object (e.g., temperature, on/off condition, operating mode of a device, etc.), and may send status reports at any desired interval having any information. The status messages may be assigned specific intervals to form a time slot arrangement for the transducers. The transducers may store any quantity of messages and/or reports, while the messages and/or reports may have any format or information. In addition, the transducers may include the transducer control module, and may directly communicate with the monitoring system.

The transducer control module may be disposed at any location suitable for communication with the transducers, and may utilize any conventional or other power source (e.g., battery, electrical generator, common wall outlet jack, etc.). The install button may be implemented by any button or other input device, and may be disposed at any location on the control module or control module housing. Alternatively, a similar input device may be disposed on the transducers to initiate or assist in the registration process. The control module may include any quantity of LEDs or other indicators to indicate successful registration of a transducer in any manner (e.g., blink any quantity of times within any desired interval, etc.). The transducers may be registered with a control module at any time and in any desired fashion (e.g., utilize special packets or other identifiers, send any information, any handshaking schemes, etc.), and utilize any techniques to ensure registration of a transducer with a proper control module. The transducer control module may include any conventional microcontroller, processor or other circuitry to control module operation. The communicator, local interface, RAM, non-volatile memory and power manager may be implemented by any conventional or other devices or circuitry performing their functions. The RAM and non-volatile memory may be implemented by any types of memory and store any desired information.

The transducer control module may accommodate any quantity of transducers. The transducers and transducer control modules may communicate via any wired or wireless communication medium (e.g., LAN, WAN, direct connection, etc.) and utilize any protocol. The communications device for the transducers and transducer control module may include any conventional or other receivers, transmitters antenna switches or antennas or other devices performing their functions. The transducers and transducer control module may communicate utilizing any transmission frequency, band or energy medium (e.g., light, RF, ultrasound, etc.). The data may be transmitted at any desired rate and in any desired format (e.g., any quantity of data, stop and parity bits). The data may be transmitted utilizing any technique or protocol.

The wireless protocol may be implemented for any wired or wireless communication scheme. The protocol packet may be of any format or size and have any quantity of fields of any size containing any desired information. The protocol may utilize any data verification techniques (e.g., parity, checksum, etc.). The checksum may be determined based on any conventional or other techniques The protocol may utilize any desired handshaking, while reply intervals or re-transmission attempts may be set to any desired values. The data may be encoded in any desired fashion. The transducer control module may store any quantity of incoming or outgoing messages and/or reports. The protocol may utilize any techniques to facilitate a single transducer of a control module transmitting at a time, and may listen for any desired interval for a carrier signal or other indication of transmission by another transducer.

The events may be defined by any quantity or type of terms, values or other settings. The events may be defined by or triggered based on measurements from any quantity or combinations of any type of transducers. The control module may send messages at any time up to an alarm condition (e.g., warning messages indicating that an alarm condition is approaching). The terms of an event may be weighted in any desired fashion to indicate an alarm or other event condition. The control module may check for communications (e.g., e-mail, messages, reports, etc.) from the monitoring system at any desired intervals for status, event definitions or other information. The transducer control module may determine time stamps or utilize external systems (e.g., GPS) to provide time stamps for various events.

The transducer control module may communicate with the monitoring system via any wired or wireless communications device or network. Messages and/or reports may be sent between the control module and monitoring system via any communications medium (e.g., satellite, e-mail, packets, etc.). The messages and/or reports may be encoded or encrypted in any fashion. The messages and/or reports (e.g., event and status) may have any quantity of formats and include any desired information. The event and status reports may be transmitted to the monitoring system at any desired intervals, while event definition reports may be sent to the control module at any desired interval.

The monitoring system may be implemented by any conventional personal or other type of computer or processing system, and include any conventional, commercially available or custom software. The monitoring system may communicate with end-user systems via any communications devices and/or networks. The web server may be implemented by any commercially available or other web server, and utilize any software package or custom software to generate and display web pages. The monitor application may check for messages and/or reports received via any communications medium (e.g., via e-mail, retrieve information from another server system, etc.) from the control module and store information in the database at any desired interval or specific times. The monitoring system may notify end-users of alarm or other conditions in any desired manner (e.g., pager, web site, facsimile, telephone, etc.). The monitoring system may maintain or record any desired information in any desired logs. The monitor application may check the database for new events or other information and send corresponding messages and/or reports to the control module at any desired intervals. The monitoring system may include any quantity of software modules arranged in any fashion and performing any quantity of the above described functions.

The database may be implemented by any conventional or other database or data storage structure (e.g., files, data structures, etc.). The database may include any quantity of tables associated in any fashion and having any desired keys. The database may be accessed in any desired fashion by any querying techniques. The database may be arranged in any fashion and store any information.

The end-user systems may be implemented by any conventional personal or other computer or processing system or device (e.g., laptop, palm pilot, cellular telephone, etc.), or be implemented by a dumb terminal connected to a mainframe or network type computer. The end-user system may access the monitoring system via nay communications medium (e.g., LAN, WAN, Internet, Intranet, wireless or wired communications, etc.). An end-user may specify any desired parameters for event or other conditions, web page layout, measurement names or any other information to control system operation. The account number and password may have any quantity of any type of alphanumeric or other characters or symbols.

The transducer control module and corresponding transducers may be available in the form of a kit. The kit may include any quantity of control modules, transducers and other devices. Alternatively, these devices may be individually available, or available in any quantities and/or combinations.

The end-user and monitoring computer systems of the present invention may be implemented by any personal or other type of computer system (e.g., IBM-compatible, Apple, Macintosh, laptop, palm pilot, etc.). The computer systems of the present invention may include any commercially available operating system (e.g., Windows, OS/2, Unix, Linux, etc.). The computer systems of the present invention may further include any commercially available or custom software (e.g., server software, browser software, etc.), and any types of input devices (e.g., keyboard, mouse, voice recognition, etc.). It is to be understood that the software for the monitoring system and controllers of the transducers and transducer control module of the present invention may be implemented in any desired computer language and could be developed by one of ordinary skill in the computer arts based on the functional descriptions contained in the specification and flow charts illustrated in the drawings. The computer systems and controllers of the present invention may alternatively be implemented by hardware or other processing circuitry. The various functions of the computer systems and controllers may be distributed in any manner among any quantity of computer or processing systems, processors or circuitry. The software and/or algorithms described above and illustrated in the flow charts may be modified in any manner that accomplishes the functions described herein. The software of the monitoring system and controllers of the present invention may be available on a recorded medium (e.g., floppy diskettes, CD-ROM, memory devices, etc.), or may be downloaded (e.g., in the form of carrier waves, packets, etc.) to the processing devices from a network.

The exact sensors and actuators used will vary with the application. For example, when monitoring private yachts for absentee owners, the sensors might include any or all of the following:

1. Bilge water level sensor (actual depth or high-low detection by float switch).
2. Bilge pump performance sensor (how long it takes to drain the bilge).
3. Leak rate sensor (how often the bilge pump comes on).
4. Battery voltage sensor (with and without charger on).
5. Battery current sensor (indicative of occupancy or electrical problem).
6. Engine starting cycles sensor (may indicate unauthorized use).
7. Engine running time sensor (for maintenance or to detect unauthorized use).

8. Engine oil level sensor.
9. Fuel level sensor.
10. Water level sensor.
11. Pitch and roll of the boat sensor (may indicate problem with mooring lines).
12. Intrusion sensor (unauthorized boarding).
13. Cabin temperature sensor.
14. Engine compartment temperature sensor.
15. Fire or smoke detectors.
16. Hazardous gas detectors.
17. Position/motion sensors for unauthorized use or mooring failure (broken anchor chain, etc.).
18. Galvanic action sensor (to detect excess galvanic action of the hull and/or fittings due to an electrical grounding fault or depletion of the sacrificial anodes).
19. Sensors to monitor operation or status of any other system on board the boat (e.g., air conditioning, food storage temperature, engine room air vents, owner's hot tub, etc.).

As a further example, a vacation home monitoring system can have similar sensors except that the emphasis would be on the basement instead of the bilge, plumbing leaks, and the performance of the heating and air conditioning system. Other sensors, such as intrusion detection, will be very similar.

The present invention is not limited to the specific applications disclosed herein but may be utilized to monitor any types of property, equipment or other objects. For example, the present invention may be utilized in substantially the same manner described above to monitor:

1. Yachts at a dock to prevent yachts from sinking at the dock from small leaks or loose moorings and to detect theft and possibly assist recovery.
2. Yachts underway to prevent incidents or expensive repairs due to malfunction of yacht systems.
3. Vacation homes to prevent costly repairs due to small problems going unnoticed in unoccupied homes (e.g., water, freezing, etc.).
4. Yachts on land to prevent theft (or enable recovery) of expensive boats stored on trailers or in boatyard racks.
5. Recreational vehicle (RV) status to prevent costly repairs due to small problems going unnoticed in RVs while stored.
6. RV security to prevent theft (or enable recovery) of RVs while stored.
7. Aircraft status to prevent costly repairs due to small problems going unnoticed in aircraft while stored (e.g., water, loose tiedowns, etc.).
8. Aircraft security to prevent theft (or enable recovery) of aircraft.
9. Medical refrigeration to prevent loss of irreplaceable medical specimens or pharmaceuticals (e.g., tissue, sperm, embryos, bacteria or virus samples, etc.) due to temperature.
10. Food storage to prevent health problems or expensive recalls due to spoiled food.
11. Poultry incubators to prevent loss of eggs/babies due to improper temperature.
12. Poultry houses to prevent loss of birds due to equipment malfunctions.
13. Livestock barns to prevent loss of animals due to equipment malfunctions.
14. Horse barns to reassure absentee owners of conditions for their expensive horses (e.g., temperature, water, stall door opening, etc.).
15. Swimming pools to alert owners/managers of unauthorized use or equipment failure.
16. Amusement park rides to prevent incidents due to malfunctioning equipment and record operation of equipment for investigation of any that do occur, and to detect changes in ride quality of rides (e.g., coaster-type rides).
17. Rental vehicle status to prevent costly repairs due to small problems going unnoticed in rental vehicles while in operation by customers.
18. Rental vehicle security to prevent theft (or enable recovery) of rental vehicles (and locate late/missing vehicles).
19. Farm equipment status to prevent costly repairs due to small problems going unnoticed in farm equipment.
20. Farm equipment security to prevent theft (or enable recovery) of expensive farm equipment.
21. Hazardous material barges to prevent catastrophic spills of hazardous material due to equipment malfunction and possibly operator error.
22. River barges tracking to solve reported problems of poor cellular coverage and power management of present tracking systems.
23. Truck tracking to find lost trucks and drivers.
24. Trailer tracking to solve reported problems of poor power management of trailer tracking systems.
25. Residential utilities to eliminate need for meter readers (e.g., in homes with full-time Internet connections).
26. Smart home status to prevent costly repairs due to small problems going unnoticed in home systems and provide integrated remote control in a home through a web server (e.g., in homes with full-time Internet connections).
27. HVAC to prevent costly repairs due to small problems going unnoticed in commercial and residential systems and to eliminate need for site visits for systems under maintenance contracts.
28. Title V equipment to eliminate need for site visits to verify operation of emission monitoring equipment, especially systems under maintenance contracts.
29. Bridge structures to detect damage (e.g., from earthquakes, impacts, etc.) to bridges and overpasses by shock or tilt sensing.
30. Tower structures to detect damage to or of deterioration of telecommunications towers by shock or tilt sensing.
31. Clean rooms to prevent (or minimize) production losses due to problems with temperature, humidity, or vibration and to prevent quality audit problems from not having continuous monitoring records.
32. Pipelines to prevent incidents and/or catastrophic spills due to equipment malfunction and possibly operator error.
33. Storage tanks to prevent incidents and/or catastrophic spills due to equipment malfunction and possibly operator error and to prevent interruption of service due to unnoticed depletion of stock.
34. Cranes to reduce chances of incidents or accidents due to improper use of portable cranes (e.g., poor load management, failure to extend outriggers, etc.) or improper maintenance.
35. Mines to detect safety or operational problems with widely-distributed mining equipment.
36. Industrial process temperature to prevent incidents or loss of production due to improper temperature.
37. Room air to detect indoor air quality problems (e.g., temperature, humidity, CO/CO2, etc.).
38. Power quality to prevent damage to sensitive equipment by detecting problems with power quality (e.g., brownouts, phase dropouts, distortion, etc.).
39. Power use to eliminate need for meter readers for large campus-type facilities with multiple sub-meters (e.g., colleges typically have hundreds of on-campus meters, may also apply to apartment complexes).

40. Water level/flow to warn of problems with stream flow (e.g., high or low).
41. Seismic to warn of possible earthquake damage to remote facilities (e.g., power substations, transmission line towers, telecommunications facilities, etc.).
42. Railway crossings to prevent incidents due to malfunctioning equipment and record operation of equipment for investigation of any that do occur.
43. Track gauge to prevent incidents due to improper track gauge (e.g., track tends to open up under use).
44. Power transmission lines to improve repair response time by reporting location (and nature) of failure.
45. Tramways/ski lifts to prevent incidents due to malfunctioning equipment and record operation of equipment for investigation of any that do occur.
46. Elevators/escalators to prevent incidents due to malfunctioning equipment and record operation of equipment for investigation of any that do occur.
47. Well-heads/pumps to reduce loss of production for remote well-head pumping station (e.g., due to equipment malfunction, depletion of fuel, etc.) and to reduce possibility (or extent) of hazardous material spill.
48. Landfills to reduce possibility (or extent) of hazardous waste contamination.
49. Parking garages/lots to improve utilization of large parking facilities by detecting empty spaces and to locate abandoned vehicles by tracking abnormal parking time.
50. Aircraft structure to detect changes in structure before hazardous condition develops (e.g., shock or 'G' loads, landing cycles, change in shape).
51. Aircraft engines to prevent incidents or expensive repairs by enabling condition-based maintenance (CBM) of aircraft engines (especially when engines are leased or under maintenance contracts).
52. High-risk drivers to reduce risk from high-risk drivers by detecting and reporting improper activities (e.g., parental reports for speed, location, hours of operation, etc.).
53. Local traffic speed to enable local communities (e.g., neighborhoods, gated communities, apartment/townhouse complexes, etc.) to detect and identify violators of local speed limits.
54. Railway ride quality to report violations of ride quality standard for railway shipments of expensive goods.
55. Truck/trailer ride quality to report violations of ride quality standard for shipments of expensive goods (e.g., attached to vehicle).
56. Cargo ride quality to report violations of ride quality standard for shipments of expensive goods (e.g., attached to cargo such as large motors, pumps, etc.).
57. Heavy equipment ride quality to prevent injury to operator due to malfunction/deterioration of suspension or seat.
58. Motor sports ride quality to provide on-the-air data on 'G' loads for various motor sports (e.g., automobiles, boats, aircraft, etc.) and provide accident data to improve design of safety systems.
59. Vending machines to detect malfunctions (e.g., including temperature of temperature-controlled unit), to reduce refill trips and/or lost sales by detecting low stock and to enable e-commerce transactions.
60. Billboards to detect equipment malfunctions, including lights and to eliminate need for site visits to read the power meter.
61. Weather to detect local hazardous and favorable weather conditions (e.g., for irrigation, sporting events, boating, etc.)

From the foregoing description, it will be appreciated that the invention makes available a novel smart remote monitoring system and method wherein end-users may remotely monitor an object and access information related to the monitored object via a communications network.

Having described preferred embodiments of a new and improved smart remote monitoring system and method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A remote monitoring system for measuring conditions of an object at a remote location and providing information relating to said measurements to an end-user, said system comprising:

at least one sensor module to measure said conditions of said remote object, wherein each sensor module is configured for attachment to said remote object by said end-user and includes a notification module to inform said remote monitoring system of the presence ofthat sensor module coupled to said remote object;

a control module local to and in communication with said at least one sensor module to receive and analyze said measured conditions and determine the occurrence of events specified by said end-user; and a monitoring system remote from and in communication with said control module to facilitate entry of said user-specified events and to receive said measured conditions from said control module and transmit said received measured conditions to a processing system of said end-user in response to a request for said measured conditions from said end-user;

wherein said notification module includes:

a message transmission module to facilitate transmission of a registration message to register said at least one sensor module with said control module;

an information transmission module to facilitate transmission of sensor module information to said control module in response to receiving a reply message within a predetermined quantity of registration message transmissions, wherein said sensor module information includes a sensor module identification and information for processing said measured conditions;

an indicator module to indicate to said end-user registration of said at least one sensor module in response to receiving said reply message from said control module indicating reception of said sensor module information;

an assignment module to assign a prior corresponding control module to said at least one sensor module in response to the absence of said reply message to transmission of said registration message; and a sleep module to place said at least one sensor module in a low power sleep mode in response to the absence of said reply message to transmission of said registration message and the absence of a prior corresponding control module.

2. The system of claim 1 further including a wireless communications network to facilitate communications between said at least one sensor module and said control module.

3. The system of claim 2 wherein at least one sensor module includes:

a sensor unit to measure a corresponding condition of said remote object; and a sensor module communications device coupled to said sensor unit to facilitate communications with said control module over said wireless communications network.

4. The system of claim 3 wherein said sensor unit includes:
 a transducer to measure said corresponding condition of said remote object and produce transducer signals indicating said measured condition;
 a sensor unit controller to process said transducer signals, wherein said sensor unit controller includes:
  a conditioning module to condition said transducer signals and produce conditioned signals for transmission to said control module;
  a storage unit to store transducer information facilitating transducer identification and processing of transducer signals; and
  a communications module to facilitate communications with said control module over said wireless communications network; and
 a controller interface disposed between said transducer and said sensor unit controller to receive said transducer signals from said transducer and produce controller signals compatible with said sensor unit controller to facilitate communications between said transducer and said sensor unit controller.

5. The system of claim 4 wherein said sensor unit controller further includes:
 a sleep state module to control said sensor module to operate in a low power sleep mode; and
 an active state module to facilitate periodic transition from said low power sleep mode to an active mode to facilitate measurement of said corresponding condition and transmission of said measured corresponding condition to said control module.

6. The system of claim 3 wherein said sensor module communications device includes:
 a receiver to receive an incoming message from said control module over said wireless communications network;
 a transmitter to transmit an outgoing message to said control module over said wireless communications network;
 an antenna to receive said incoming message and transmit said outgoing message in the form of radio signals; and
 an antenna switch to selectively couple said receiver and transmitter to said antenna to respectively receive said incoming message and transmit said outgoing message.

7. The system of claim 3 wherein said control module includes:
 a control module communications device to facilitate communications with each said sensor module via said wireless communications network;
 a module controller to process said measured conditions received from said at least one sensor module and facilitate communications with said monitoring system, wherein said module controller includes:
  a registration module to register said at least one sensor module with said remote monitoring system in response to receiving notification from said at least one sensor module via said notification module and to receive and store sensor module information corresponding to said at least one sensor module, wherein said sensor module information includes a sensor module identification and information for processing said measured conditions;
  an event module to process said received measured conditions in accordance with said corresponding sensor module information and to determine occurrence of said events specified by said end-user and received from said monitoring system; and
  a communications module to facilitate communications with said at least one sensor module over said wireless communications network; and
 a module communications unit to facilitate communications with said monitoring system.

8. The system of claim 1 wherein said control module further includes:
 a power source;
 a power management module to monitor said power source and power facilities at said remote location; and
 a local interface to provide a direct connection to said control module to retrieve control module status information and set control module parameters.

9. The system of claim 2 wherein said at least one sensor module and said control module each include:
 a transmission module to facilitate on/off keyed transmissions to enable communication between said at least one sensor module and said control module via said wireless communications network; and
 a reception module to receive and decode said on/off keyed transmissions.

10. The system of claim 9 wherein said transmission module includes:
 an encoding module to encode an outgoing message for transmission over said wireless communications network;
 an error checking module to insert message validity information within said outgoing message to facilitate a determination of message validity by said reception module;
 a monitor module to determine the presence of an available communication link on said wireless communications network and to facilitate transmission of said encoded message in response to determining the presence of said available communication link;
 a storage module to store said encoded message in response to determining the absence of said available communication link;
 a re-transmission module to periodically re-transmit said encoded message in response to the absence of a reply message to an initial transmission of said encoded message; and
 a discard module to discard said encoded message in response to expiration of a prescribed time interval prior to receiving said reply message.

11. The system of claim 10 wherein said encoding module includes:
 a bit conversion module to translate each bit within said outgoing message into a bit pair, wherein each bit within said bit pair has a different state.

12. The system of claim 11 wherein said error checking module includes:
 a checksum module to produce a checksum for said outgoing message to enable determination of message validity by said reception module.

13. The system of claim 10 wherein said reception module includes:
 a retrieval module to receive said outgoing message until complete reception of said outgoing message or expiration of a prescribed reception time interval;

a validity module to examine said message validity information of said received message and determine validity of said received message;

a message processor to process said received message in response to said validity module determining that said received message is valid; and an acknowledgment module to facilitate transmission of a reply message in response to determining that said received message is of a type requiring transmission of said reply message.

14. The system of claim 1 further including a first wide area network to facilitate communications between said control module and said monitoring system.

15. The system of claim 14 wherein said first wide area network includes a satellite network.

16. The system of claim 14 wherein said monitoring system includes:

a monitor interface module to facilitate communications with said control module over said first wide area network, wherein said monitor interface module includes:

a message processor to receive incoming messages including information relating to said measured conditions and occurrence of said user-specified events from said control module; and a message transmission module to facilitate transmission of outgoing messages including information relating to said user-specified events to said control module via said first wide area network;

a monitor storage unit to store information relating to said end-user, said user-specified events and said measured conditions; and an end-user module to facilitate communications with said end-user processing system to transmit information to and receive information from said end-user.

17. The system of claim 16 wherein said end-user module includes:

a request processor to process an information request received from said end-user and to transmit information indicated in said information request and relating to said measured conditions to said end-user processing system via a second wide area network; and an event definition module to receive and process an event definition from said end-user specifying an event and facilitate transmission of said event definition to said control module via said monitor interface module.

18. The system of claim 16 wherein said monitor interface module further includes:

an alarm notification module to transmit a notification to persons designated by said end-user in response to receiving an incoming message from said control module indicating occurrence of a corresponding user-specified event.

19. The system of claim 17 further including plural sensor modules, wherein at least one event definition is based on measurements from at least two different sensor modules.

20. The system of claim 2 wherein said monitoring system facilitates entry of commands to control said remote object and transmits said commands to said control module, and at least one sensor module includes:

an actuator unit to control said remote object in response to said commands received from said control module; and a control module communications device coupled to said actuator unit to facilitate communications with said control module over said wireless communications network.

21. In a remote monitoring system, a method of measuring conditions of an object at a remote location and providing information relating to said measurements to an end-user, said method comprising the steps of:

(a) measuring said conditions of said remote object via at least one sensor module, wherein said at least one sensor module is configured for attachment to said remote object by said end-user;

(b) receiving and analyzing said measured conditions and determining the occurrence of events specified by said end-user via a control module local to and in communication with said at least one sensor module; and (c) facilitating entry of said user-specified events and receiving said measured conditions from said control module and transmitting said received measured conditions to a processing system of said end-user in response to a request for said measured conditions from said end-user via a monitoring system remote from and in communication with said control module;

wherein step (a) further includes:

(a.1) informing said remote monitoring system, via said at least one sensor module, of the presence of that sensor module coupled to said remote object, wherein step (a.1) further includes:

(a.1.1) transmitting a registration message to register said at least one sensor module with said control module;

(a.1.2) transmitting sensor module information to said control module in response to receiving a reply message within a predetermined quantity of registration message transmissions, wherein said sensor module information includes a sensor module identification and information for processing said measured conditions;

(a.1.3) indicating to said end-user registration of said at least one sensor module in response to receiving said reply message from said control module indicating reception of said sensor module information;

(a.1.4) assigning a prior corresponding control module to said at least one sensor module in response to the absence of said reply message to transmission of said registration message; and (a.1.5) placing said at least one sensor module in a low power sleep mode in response to the absence of said reply message to transmission of said registration message and the absence of a prior corresponding control module.

22. The method of claim 21 wherein step (b) further includes:

(b.1) receiving said measured conditions via a wireless communications network facilitating communications between said at least one sensor module and said control module.

23. The method of claim 22 wherein step (a) further includes:

(a.2) measuring a corresponding condition of said remote object via at least one sensor module; and (a.3) facilitating communications between said at least one sensor module and said control module over said wireless communications network.

24. The method of claim 23 wherein said step (a.2) includes:

(a.2.1) measuring said corresponding condition of said remote object via a transducer and producing transducer signals indicating said measured condition;

(a.2.2) conditioning said transducer signals and producing conditioned signals for transmission to said control module via a sensor controller;

(a.2.3) storing transducer information facilitating transducer identification and processing of said transducer signals in a storage unit of said sensor controller; and (a.2.4) processing said transducer signals from said transducer to produce controller signals compatible with said sensor controller to facilitate communications between said transducer and said sensor controller.

25. The method of claim 24 wherein step (a.2.1) further includes:

(a.2.1.1) controlling said at least one sensor module to operate in a low power sleep mode; and (a.2.1.2) facilitating periodic transition from said low power sleep mode to an active mode to facilitate measurement of said corresponding condition and transmission of said measured corresponding condition to said control module.

26. The method of claim 23 wherein step (a.3) includes:

(a.3.1) receiving an incoming message at said at least one sensor module from said control module over said wireless communications network via a receiver;

(a.3.2) transmitting an outgoing message from said at least one sensor module to said control module over said wireless communications network via a transmitter;

(a.3.3) receiving said incoming message and transmitting said outgoing message in the form of radio signals via an antenna; and (a.3.4) selectively coupling said receiver and transmitter to said antenna to respectively receive said incoming message and transmit said outgoing message.

27. The method of claim 23 wherein step (b) further includes:

(b.2) processing said measured conditions received from said at least one sensor module and facilitating communications with said monitoring system;

(b.3) registering said at least one sensor module with said remote monitoring system in response to receiving notification from said at least one sensor module and receiving and storing sensor module information corresponding to said at least one sensor module, wherein said sensor module information includes a sensor module identification and information for processing said measured conditions; and (b.4) processing said received measured conditions in accordance with said corresponding sensor module information and determining occurrence of said events specified by said end-user and received from said monitoring system.

28. The method of claim 27 wherein step (b) further includes:

(b.5) monitoring a power source and power facilities at said remote location; and (b.6) providing a direct connection to said control module to retrieve control module status information and set control module parameters.

29. The method of claim 23 wherein step (a.3) includes:

(a.3.1) facilitating on/off keyed transmissions by said at least one sensor module and said control module to enable communication between said at least one sensor module and said control module via said wireless communications network; and (a.3.2) receiving and decoding said on/off keyed transmissions at said at least one sensor module and said control module.

30. The method of claim 29 wherein step (a.3.1) includes:

(a.3.1.1) encoding an outgoing message for transmission over said wireless communications network;

(a.3.1.2) inserting message validity information within said outgoing message to facilitate a determination of message validity at step (a.3.2);

(a.3.1.3) determining the presence of an available communication link on said wireless communications network and transmitting said encoded message in response to determining the presence of said available communication link;

(a.3.1.4) storing said encoded message in response to determining the absence of said available communication link;

(a.3.1.5) periodically re-transmitting said encoded message in response to the absence of a reply message to an initial transmission of said encoded message; and (a.3.1.6) discarding said encoded message in response to expiration of a prescribed time interval prior to receiving said reply message.

31. The method of claim 30 wherein step (a.3.1.1) includes:

(a.3.1.1.1) encoding said outgoing message by translating each bit within said outgoing message into a bit pair, wherein each bit within said bit pair has a different state.

32. The method of claim 30 wherein step (a.3.1.2) includes: (a.3.1.2.1) producing a checksum for said outgoing message to enable determination of message validity at step (a.3.2).

33. The method of claim 30 wherein step (a.3.2) includes:

(a.3.2.1) receiving said outgoing message until complete reception of said outgoing message or expiration of a prescribed reception time interval;

(a.3.2.2) examining said message validity information of said received message and determining validity of said received message;

(a.3.2.3) processing said received message in response to step (a.3.2.2) determining that said received message is valid; and (a.3.2.4) transmitting a reply message in response to determining that said received message is of a type requiring transmission of said reply message.

34. The method of claim 21 wherein step (b) further includes:

(b.1) facilitating communications between said control module and said monitoring system via a first wide area network.

35. The method of claim 21 wherein step (b) further includes:

(b.1) facilitating communications between said control module and said monitoring system via a satellite network.

36. The method of claim 34 wherein step (c) includes:

(c.1) facilitating communications with said control module over said first wide area network;

(c.2) receiving incoming messages including information relating to said measured conditions and occurrence of said user-specified events from said control module;

(c.3) transmitting outgoing messages including information relating to said user-specified events to said control module via said first wide area network;

(c.4) storing information relating to said end-user, said user-specified events and said measured conditions; and (c.5) facilitating communications with said end-user processing system to transmit information to and receive information from said end-user.

37. The method of claim 36 wherein step (c.5) includes:
(c.5.1) processing an information request received from said end-user and transmitting information indicated in said information request and relating to said measured conditions to said end-user processing system via a second wide area network; and
(c.5.2) receiving and processing an event definition from said end-user specifying an event and transmitting said event definition to said control module to facilitate determination of occurrence of said event.

38. The method of claim 36 wherein step (c) further includes:
(c.6) transmitting a notification to persons designated by said end-user in response to receiving an incoming message from said control module indicating occurrence of a corresponding user-specified event.

39. The method of claim 37 wherein plural sensor modules measure said conditions of said remote object, and step (c.5.2) further includes:
(c.5.2.1) receiving and processing at least one event definition based on measurements from at least two different sensor modules.

40. The method of claim 22 wherein step (c) further includes:
(c.1) facilitating entry of commands to control said remote object and transmitting said commands to said control module.

41. The method of claim 40 wherein step (a) further includes:
(a.2) controlling said remote object via at least one sensor module in response to said commands received from said control module.

42. A remote monitoring kit for measuring conditions of an object at a remote location and providing information relating to said measurements to a remote monitoring system for display to an end-user, wherein said remote monitoring system facilitates entry of user-specified events and receives said measured conditions from said kit and transmits said received measured conditions to a processing system of said end-user, said kit comprising:
at least one sensor module to measure said conditions of said remote object, wherein each sensor module is configured for attachment to said remote object by said end-user and includes a notification module to inform said remote monitoring system of the presence of that sensor module coupled to said remote object; and
a control module local to and in communication with said at least one sensor module to receive and analyze said measured conditions and determine the occurrence of said user-specified events received from said remote monitoring system, wherein said control module is remote from and in communication with said remote monitoring system;
wherein said notification module includes:
a message transmission module to facilitate transmission of a registration message to register said at least one sensor module with said control module;
an information transmission module to facilitate transmission of sensor module information to said control module in response to receiving a reply message within a predetermined quantity of registration message transmissions, wherein said sensor module information includes a sensor module identification and information for processing said measured conditions;
an indicator module to indicate to said end-user registration of said at least one sensor module in response to receiving said reply message from said control module indicating reception of said sensor module information;
an assignment module to assign a prior corresponding control module to said at least one sensor module in response to the absence of said reply message to transmission of said registration message; and
a sleep module to place said at least one sensor module in a low power sleep mode in response to the absence of said reply message to transmission of said registration message and the absence of a prior corresponding control module.

43. The kit of claim 42 wherein communications between said at least one sensor module and said control module are facilitated via a wireless communications network.

44. The kit of claim 43 wherein at least one sensor module includes:
a sensor unit to measure a corresponding condition of said remote object; and
a sensor module communications device coupled to said sensor unit to facilitate communications with said control module over said wireless communications network.

45. The kit of claim 43 wherein said remote monitoring system facilitates entry of commands to control said remote object and transmits said commands to said control module, and at least one sensor module includes:
an actuator unit to control said remote object in response to said commands received from said control module; and
a control module communications device coupled to said actuator unit to facilitate communications with said control module over said wireless communications network.

46. The kit of claim 43 wherein said control module includes:
a control module communications device to facilitate communications with each said sensor module via said wireless communications network;
a module controller to process said measured conditions received from said at least one sensor module and facilitate communications with said remote monitoring system, wherein said module controller includes:
a registration module to register said at least one sensor module with said remote monitoring system in response to receiving notification from said at least one sensor module via said notification module and to receive and store sensor module information corresponding to said at least one sensor module, wherein said sensor module information includes a sensor module identification and information for processing said measured conditions;
an event module to process said received measured conditions in accordance with said corresponding sensor module information and to determine occurrence of said events specified by said end-user and received from said remote monitoring system; and
a communications module to facilitate communications with said at least one sensor module over said wireless communications network; and
a module communications unit to facilitate communications with said remote monitoring system.

47. The kit of claim 43 wherein said at least one sensor module and said control module each include:

a transmission module to facilitate on/off keyed transmissions to enable communication between said at least one sensor module and said control module via said wireless communications network; and a reception module to receive and decode said on/off keyed transmissions.

48. A method of measuring conditions of an object at a remote location via a remote monitoring kit that measures said conditions and provides information relating to said measurements to a remote monitoring system for display to an end-user, wherein said remote monitoring system facilitates entry of user-specified events and receives said measured conditions from said kit and transmits said received measured conditions to a processing system of said end-user, said method comprising the steps of:
  (a) connecting at least one sensor module of said kit to said remote object to measure said conditions of said remote object, wherein each sensor module is configured for attachment to said remote object by said end-user;
  (b) informing a control module of said kit of the presence of said at least one sensor module, wherein said control module is local to and in communication with said at least one sensor module to receive notification from said at least one sensor module indicating said presence of said at least one sensor module, and step (b) further includes:
    (b.1) transmitting a registration message to register said at least one sensor module with said control module;
    (b.2) transmitting sensor module information to said control module in response to receiving a reply message within a predetermined quantity of registration message transmissions, wherein said sensor module information includes a sensor module identification and information for processing said measured conditions;
    (b.3) indicating to said end-user registration of said at least one sensor module in response to receiving said reply message from said control module indicating reception of said sensor module information;
    (b.4) assigning a prior corresponding control module to said at least one sensor module in response to the absence of said reply message to transmission of said registration message; and
    (b.5) placing said at least one sensor module in a low power sleep mode in response to the absence of said reply message to transmission of said registration message and the absence of a prior corresponding control module;
  (c) entering said user-specified events into said remote monitoring system;
  (d) measuring said conditions of said remote object via said at least one sensor module;
  (e) receiving and analyzing said measured conditions at said control module and determining the occurrence of said user-specified events received from said remote monitoring system, wherein said control module is remote from and in communication with said remote monitoring system; and
  (f) accessing said remote monitoring system via said processing system to retrieve said measured conditions.

49. The method of claim 48 wherein step (e) includes:
  (e.1) facilitating communications between said at least one sensor module and said control module via a wireless communications network.

50. The method of claim 48 wherein at least one sensor module includes an actuator unit, and step (c) includes:
  (c.1) entering commands into said remote monitoring system to control said remote object and transmitting said commands to said control module; and
  step (d) includes:
  (d.1) controlling said remote object via said actuator unit of said at least one sensor module in response to said commands received from said control module.

51. The method of claim 49 wherein step (e) further includes:
  (e.2) facilitating on/off keyed transmissions from said at least one sensor module and said control module to enable communications via said wireless communications network; and
  (e.3) receiving and decoding at said at least one sensor module and said control module said on/off keyed transmissions.

52. The method of claim 48 wherein plural sensor modules measure said conditions of said remote object, and step (c) further includes:
  (c.1) entering at least one event based on measurements from at least two different sensor modules.

53. A remote monitoring system for measuring conditions of an object at a remote location and providing information relating to said measurements to an end-user, said system comprising:
  a plurality of sensor modules to measure said conditions of said remote object;
  a control module local to and in communication with each said sensor module to receive and analyze said measured conditions and determine the occurrence of events specified by said end-user, wherein said events are based on measurements from at least two different sensor modules; and
  a monitoring system remote from and in communication with said control module to facilitate entry of said user-specified events and to receive said measured conditions from said control module and transmit said received measured conditions to a processing system of said end-user in response to a request for said measured conditions from said end-user;
  wherein each sensor module includes a notification module to inform said remote monitoring system of the presence of that sensor module, said notification module including:
    a message transmission module to facilitate transmission of a registration message to register that sensor module with said control module;
    an information transmission module to facilitate transmission of sensor module information to said control module in response to receiving a reply message within a predetermined quantity of registration message transmissions, wherein said sensor module information includes a sensor module identification and information for processing said measured conditions;
    an indicator module to indicate to said end-user registration of that sensor module in response to receiving said reply message from said control module indicating reception of said sensor module information;
    an assignment module to assign a prior corresponding control module to that sensor module in response to the absence of said reply message to transmission of said registration message; and
    a sleep module to place that sensor module in a low power sleep mode in response to the absence of said reply message to transmission of said registration message and the absence of a prior corresponding control module.

54. The system of claim 53 wherein communications between said sensor modules and said control module are facilitated via a wireless communications network.

55. The system of claim 54 wherein at least one sensor module includes:
- a sensor unit to measure a corresponding condition of said remote object; and
- a sensor module communications device coupled to said sensor unit to facilitate communications with said control module over said wireless communications network.

56. The system of claim 54 wherein said monitoring system facilitates entry of commands to control said remote object and transmits said commands to said control module, and at least one sensor module includes:
- an actuator unit to control said remote object in response to said commands received from said control module; and
- a control module communications device coupled to said actuator unit to facilitate communications with said control module over said wireless communications network.

57. The system of claim 54 wherein said control module includes:
- a control module communications device to facilitate communications with each said sensor module via said wireless communications network;
- a module controller to process said measured conditions received from said sensor modules and facilitate communications with said monitoring system, wherein said module controller includes:
  - a registration module to register each said sensor module with said remote monitoring system in response to receiving notification from that sensor module and to receive and store sensor module information corresponding to that sensor module, wherein said sensor module information includes a sensor module identification and information for processing said measured conditions;
  - an event module to process said received measured conditions in accordance with said corresponding sensor module information and to determine occurrence of said events specified by said end-user and received from said monitoring system; and
  - a communications module to facilitate communications with said sensor modules over said wireless communications network; and
- a module communications unit to facilitate communications with said monitoring system.

58. The system of claim 54 wherein said sensor modules and said control module each include:
- a transmission module to facilitate on/off keyed transmissions to enable communication between said sensor modules and said control module via said wireless communications network; and
- a reception module to receive and decode said on/off keyed transmissions.

59. The system of claim 53 wherein said monitoring system includes an alarm notification module to transmit a notification to persons designated by said end-user in response to receiving an incoming message from said control module indicating occurrence of a corresponding user-specified event.

60. In a remote monitoring system, a method of measuring conditions of an object at a remote location and providing information relating to said measurements to an end-user, said method comprising the steps of:
(a) measuring said conditions of said remote object via a plurality of sensor modules;
(b) receiving and analyzing said measured conditions and determining the occurrence of events specified by said end-user via a control module local to and in communication with said sensor modules, wherein said events are based on measurements from at least two different sensor modules; and
(c) facilitating entry of said user-specified events and receiving said measured conditions from said control module and transmitting said received measured conditions to a processing system of said end-user in response to a request for said measured conditions from said end-user via a monitoring system remote from and in communication with said control module;
wherein step (a) further includes:
(a.1) informing said remote monitoring system, via each sensor module, of the presence of that sensor module, wherein step (a.1) further includes:
(a.1.1) transmitting a registration message to register that sensor module with said control module;
(a.1.2) transmitting sensor module information to said control module in response to receiving a reply message within a predetermined quantity of registration message transmissions, wherein said sensor module information includes a sensor module identification and information for processing said measured conditions;
(a.1.3) indicating to said end-user registration of that sensor module in response to receiving said reply message from said control module indicating reception of said sensor module information;
(a.1.4) assigning a prior corresponding control module to that sensor module in response to the absence of said reply message to transmission of said registration message; and
(a.1.5) placing that sensor module in a low power sleep mode in response to the absence of said reply message to transmission of said registration message and the absence of a prior corresponding control module.

61. The method of claim 60 wherein step (b) further includes:
(b.1) receiving said measured conditions via a wireless communications, network facilitating communications between said sensor modules and said control module.

62. The method of claim 61 wherein step (c) further includes:
(c.1) facilitating entry of commands to control said remote object and transmitting said commands to said control module.

63. The method of claim 62 wherein step (a) further includes:
(a.2) controlling said remote object via at least one sensor module in response to said commands received from said control module.

64. The method of claim 61 wherein step (b) further includes:
(b.2) processing said measured conditions received from said sensor modules and facilitating communications with said monitoring system;
(b.3) registering each said sensor module with said remote monitoring system in response to receiving notification from that sensor module and receiving and storing sensor module information corresponding to that sensor module, wherein said sensor module information includes a sensor module identification and information for processing said measured conditions; and (b.4) processing said received measured conditions in accordance with said corresponding sensor module information and determining occurrence of said events specified by said end-user and received from said monitoring system.

65. The method of claim 61 wherein step (b.1) includes:

(b.1.1) facilitating on/off keyed transmissions by said sensor modules and said control module to enable communication between said sensor modules and said control module via said wireless communications network; and (b.1.2) receiving and decoding said on/off keyed transmissions at said sensor modules and said control module.

66. The method of claim 60 wherein step (c) further includes:

(c.1) transmitting a notification to persons designated by said end-user in response to receiving an incoming message from said control module indicating occurrence of a corresponding user-specified event.

67. The system of claim 1 wherein said control module includes:

a clock module to maintain an indication of current time; and an event time module to provide a time stamp corresponding to said current time indication for said determined occurrence of end-user specified events for transmission with event information to said monitoring system.

68. The system of claim 1 wherein said control module includes:

a receiver module to receive location information associated with said remote object from a Global Positioning System for transmission of object position information to said monitoring system.

69. The system of claim 68 wherein said control module further includes:

a report module to periodically generate a report including a location of said remote object indicated by said received location information for transmission to said monitoring system.

70. The system of claim 68 wherein said control module further includes:

an event location module to provide a location associated with said determined occurrence of end-user specified events and indicated by said received location information for transmission to said monitoring system.

71. The system of claim 1 wherein said control module includes:

a receiver module to receive time information from a Global Positioning System; and a clock module to maintain an indication of current time in accordance with said received time information to facilitate determination of time indications associated with said remote object for transmission to said monitoring system.

72. The method of claim 21 wherein step (b) further includes:

(b.1) maintaining an indication of current time; and (b.2) generating a time stamp corresponding to said current time indication for said determined occurrence of end-user specified events for transmission with event information to said monitoring system.

73. The method of claim 21 wherein step (b) further includes:

(b.1) receiving location information associated with said remote object from a Global Positioning System for transmission of object position information to said monitoring system.

74. The method of claim 73 wherein step (b) further includes:

(b.2) periodically generating a report including a location of said remote object indicated by said received location information for transmission to said monitoring system.

75. The method of claim 73 wherein step (b) further includes:

(b.2) determining a location associated with said determined occurrence of end-user specified events in accordance with said received location information for transmission to said monitoring system.

76. The method of claim 21 wherein step (b) further includes:

(b.1) receiving time information from a Global Positioning System; and (b.2) maintaining an -indication of current time in accordance with said received time information to facilitate determination of time indications associated with said remote object for transmission to said monitoring system.

77. The kit of claim 42 wherein said control module includes:

a clock module to maintain an indication of current time; and an event time module to provide a time stamp corresponding to said current time indication for said determined occurrence of end-user specified events for transmission with event information to said remote monitoring system.

78. The kit of claim 42 wherein said control module includes:

a receiver module to receive location information associated with said remote object from a Global Positioning System for transmission of object position information to said remote monitoring system.

79. The kit of claim 78 wherein said control module further includes:

a report module to periodically generate-a report including a location of said remote object indicated by said received location information for transmission to said remote monitoring system.

80. The kit of claim 78 wherein said control module further includes:

an event location module to provide a location associated with said determined occurrence of end-user specified events and indicated by said received location information for transmission to said remote monitoring system.

81. The kit of claim 42 wherein said control module includes:

a receiver module to receive time information from a Global Positioning System; and a clock module to maintain an indication of current time in accordance with said received time information to facilitate determination of time indications associated with said remote object for transmission to said remote monitoring system.

82. The method of claim 48 wherein step (e) further includes:
(e.1) maintaining an indication of current time; and
(e.2) generating a time stamp corresponding to said current time indication for said determined occurrence of end-user specified events for transmission with event information to said remote monitoring system.

83. The method of claim 48 wherein step (e) further includes:
(e.1) receiving location information associated with said remote object from a Global Positioning System for transmission of object position information to said remote monitoring system.

84. The method of claim 83 wherein step (e) further includes:
(e.2) periodically generating a report including a location of said remote object indicated by said received location information for transmission to said remote monitoring system.

85. The method of claim 83 wherein step (e) further includes:
(e.2) determining a location associated with said determined occurrence of end-user specified events in accordance with said received location information for transmission to said remote monitoring system.

86. The method of claim 48 wherein step (e) further includes:
(e.1) receiving time information from a Global Positioning System; and
(e.2) maintaining an indication of current time in accordance with said received time information to facilitate determination of time indications associated with said remote object for transmission to said remote monitoring system.

87. The system of claim 53 wherein said control module includes:
a clock module to maintain an indication of current time; and
an event time module to provide a time stamp corresponding to said current time indication for said determined occurrence of end-user specified events for transmission with event information to said monitoring system.

88. The system of claim 53 wherein said control module includes:
a receiver module to receive location information associated with said remote object from a Global Positioning System for transmission of object position information to said monitoring system.

89. The system of claim 88 wherein said control module further includes:
a report module to periodically generate a report including a location of said remote object indicated by said received location information for transmission to said monitoring system.

90. The system of claim 88 wherein said control module further includes:
an event location module to provide a location associated with said determined occurrence of end-user specified events and indicated by said received location information for transmission to said monitoring system.

91. The system of claim 53 wherein said control module includes:
a receiver module to receive time information from a Global Positioning System; and
a clock module to maintain an indication of current time in accordance with said received time information to facilitate determination of time indications associated with said remote object for transmission to said monitoring system.

92. The method of claim 60 wherein step (b) further includes:
(b.1) maintaining an indication of current time; and
(b.2) generating a time stamp corresponding to said current time indication for said determined occurrence of end-user specified events for transmission with event information to said monitoring system.

93. The method of claim 60 wherein step (b) further includes:
(b.1) receiving location information associated with said remote object from a Global Positioning System for transmission of object position information to said monitoring system.

94. The method of claim 93 wherein step (b) further includes:
(b.2) periodically generating a report including a location of said remote object indicated by said received location information for transmission to said monitoring system.

95. The method of claim 93 wherein step (b) further includes:
(b.2) determining a location associated with said determined occurrence of end-user specified events in accordance with said received location information for transmission to said monitoring system.

96. The method of claim 73 wherein step (b) further includes:
(b.1) receiving time information from a Global Positioning System; and
(b.2) maintaining an indication of current time in accordance with said received time information to facilitate determination of time indications associated with said remote object for transmission to said monitoring system.

97. A remote monitoring system for measuring conditions of an object at a remote location and providing information relating to said measurements to an end-user, said system comprising:
at least one sensor means for measuring said conditions of said remote object, wherein each sensor means is configured for attachment to said remote object by said end-user and includes notification means for informing said remote monitoring system of the presence ofthat sensor means coupled to said remote object;
control means local to and in communication with said at least one sensor means for receiving and analyzing said measured conditions and determining the occurrence of events specified by said end-user; and
monitoring means remote from and in communication with said control means for facilitating entry of said user-specified events and receiving said measured conditions from said control means and transmitting said received measured conditions to a processing system of said end-user in response to a request for said measured conditions from said end-user;
wherein said notification means includes:
message transmission means for facilitating transmission of a registration message to register said at least one sensor means with said control means;
information transmission means for facilitating transmission of sensor means information to said control means in response to receiving a reply message within a predetermined quantity of registration message transmissions, wherein said sensor means information includes a sensor means identification and information for processing said measured conditions;

indicator means for indicating to said end-user registration of said at least one sensor means in response to receiving said reply message from said control means indicating reception of said sensor means information;

assignment means for assigning a prior corresponding control means to said at least one sensor means in response to the absence of said reply message to transmission of said registration message; and sleep means for placing said at least one sensor means in a low power sleep mode in response to the absence of said reply message to transmission of said registration message and the absence of a prior corresponding control means.

98. A remote monitoring kit for measuring conditions of an object at a remote location and providing information relating to said measurements to a remote monitoring system for display to an end-user, wherein said remote monitoring system facilitates entry of user-specified events and receives said measured conditions from said kit and transmits said received measured conditions to a processing system of said end-user, said kit comprising:

at least one sensor means for measuring said conditions of said remote object, wherein each sensor means is configured for attachment to said remote object by said end-user and includes notification means for informing said remote monitoring system of the presence of that sensor means coupled to said remote object; and control means local to and in communication with said at least one sensor means for receiving and analyzing said measured conditions and determining the occurrence of said user-specified events received from said remote monitoring system, wherein said control means is remote from and in communication with said remote monitoring system;

wherein said notification means includes:
message transmission means for facilitating transmission of a registration message to register said at least one sensor means with said control means;

information transmission means for facilitating transmission of sensor means information to said control means in response to receiving a reply message within a predetermined quantity of registration message transmissions, wherein said sensor means information includes a sensor means identification and information for processing said measured conditions;

indicator means for indicating to said end-user registration of said at least one sensor means in response to receiving said reply message from said control means indicating reception of said sensor means information;

assignment means for assigning a prior corresponding control means to said at least one sensor means in response to the absence of said reply message to transmission of said registration message; and sleep means for placing said at least one sensor means in a low power sleep mode in response to the absence of said reply message to transmission of said registration message and the absence of a prior corresponding control means.

99. A remote monitoring system for measuring conditions of an object at a remote location and providing information relating to said measurements to an end-user, said system comprising:

a plurality of sensor means for measuring said conditions of said remote object;

control means local to and in communication with each said sensor means for receiving and analyzing said measured conditions and determining the occurrence of events specified by said end-user, wherein said events are based on measurements from at least two different sensor means; and monitoring means remote from and in communication with said control means for facilitating entry of said user-specified events and receiving said measured conditions from said control means and transmitting said received measured conditions to a processing system of said end-user in response to a request for said measured conditions from said end-user;

wherein each sensor means includes notification means for informing said remote monitoring system of the presence of that sensor means, said notification means including:
message transmission means for facilitating transmission of a registration message to register that sensor means with said control means;

information transmission means for facilitating transmission of sensor means information to said control means in response to receiving a reply message within a predetermined quantity of registration message transmissions, wherein said sensor means information includes a sensor means identification and information for processing said measured conditions;

indicator means for indicating to said end-user registration of that sensor means in response to receiving said reply message from said control means indicating reception of said sensor means information;

assignment means for assigning a prior corresponding control means to that sensor means in response to the absence of said reply message to transmission of said registration message; and sleep means for placing that sensor means in a low power sleep mode in response to the absence of said reply message to transmission of said registration message and the absence of a prior corresponding control means.

* * * * *